US012737304B2

(12) United States Patent
Pokam et al.

(10) Patent No.: US 12,737,304 B2
(45) Date of Patent: Sep. 15, 2026

(54) PRIORITIZING ENTRIES OF AN INSTRUCTION FETCH RESOURCE AFTER STALL-RETIREMENT EVENTS

(71) Applicant: Intel Corporation, Santa Clara, CA (US)

(72) Inventors: Gilles Pokam, Livermore, CA (US); Andre Seznec, Acigne (FR); Jared Warner Stark, IV, Portland, OR (US); Bhargav Reddy Godala, Princeton, NJ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/120,929

(22) Filed: Mar. 13, 2023

(65) Prior Publication Data

US 2024/0311151 A1 Sep. 19, 2024

(51) Int. Cl.
*G06F 12/126* (2016.01)
*G06F 9/38* (2018.01)
*G06F 12/12* (2016.01)

(52) U.S. Cl.
CPC .......... *G06F 12/126* (2013.01); *G06F 9/3802* (2013.01); *G06F 12/12* (2013.01)

(58) Field of Classification Search
CPC ...... G06F 9/3802; G06F 9/3854; G06F 12/12; G06F 12/126
See application file for complete search history.

(56) References Cited

U.S. PATENT DOCUMENTS

| | | | | |
|---|---|---|---|---|
| 4,458,310 | A * | 7/1984 | Chang | G06F 12/123 711/E12.074 |
| 8,127,085 | B2 | 2/2012 | Rappoport et al. | |
| 2006/0143396 | A1* | 6/2006 | Cabot | G06F 12/121 711/134 |
| 2010/0318742 | A1* | 12/2010 | Plondke | G06F 12/121 711/123 |
| 2019/0114422 | A1* | 4/2019 | Johnson | G06F 9/30098 |
| 2021/0157739 | A1* | 5/2021 | Gholkar | G06F 12/126 |
| 2022/0100520 | A1 | 3/2022 | Pokam et al. | |
| 2022/0318020 | A1 | 10/2022 | Lowes et al. | |
| 2022/0335126 | A1 | 10/2022 | Chappell et al. | |
| 2023/0418757 | A1 | 12/2023 | Soundararajan et al. | |

OTHER PUBLICATIONS

Wikipedia, "Cache replacement policies", Mar. 11, 2022, 9 pages.*

* cited by examiner

*Primary Examiner* — David J. Huisman
(74) *Attorney, Agent, or Firm* — Essential Patents Group, LLP

(57) ABSTRACT

Techniques and mechanisms for prioritizing entries of a processor resource which is accessed to facilitate the fetching of an instruction for execution. In an embodiment, a first entry of the resource includes, or otherwise corresponds to, a version of the instruction. The first entry is prioritized based on an event wherein the instruction is retired from execution after a front end stall which is due to the instruction. While the first entry is prioritized, the entry is protected from a selection to be evicted from the resource. In another embodiment, second entries of a cache are variously prioritized, based on respective retirement events, to be available for instruction prefetching.

20 Claims, 17 Drawing Sheets

210

Search multiple entries of an instruction fetch resource to detect a location of a version of a first instruction, the multiple entries each corresponding to a different respective instruction

212

Assign a first priority to a first entry of the multiple entries based on a retirement event wherein the first instruction is retired after a stall of the processor, wherein the stall is based on the first instruction

214

Select a victim entry to be evicted from the instruction fetch resource, the selecting based on a prioritization scheme comprising the first priority and the second priority, wherein the victim entry is selected from among only one or more entries which are assigned the second priority

FIG. 2

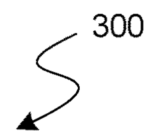
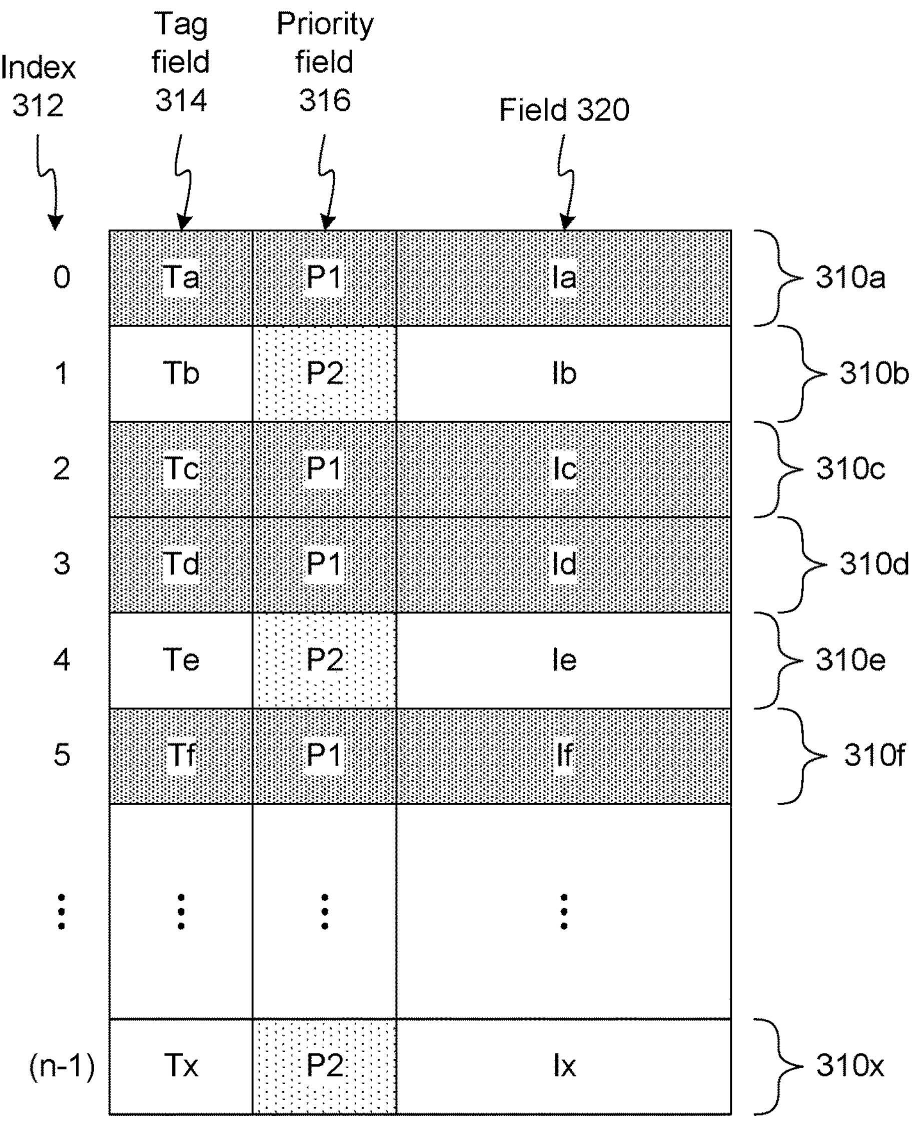
FIG. 3A

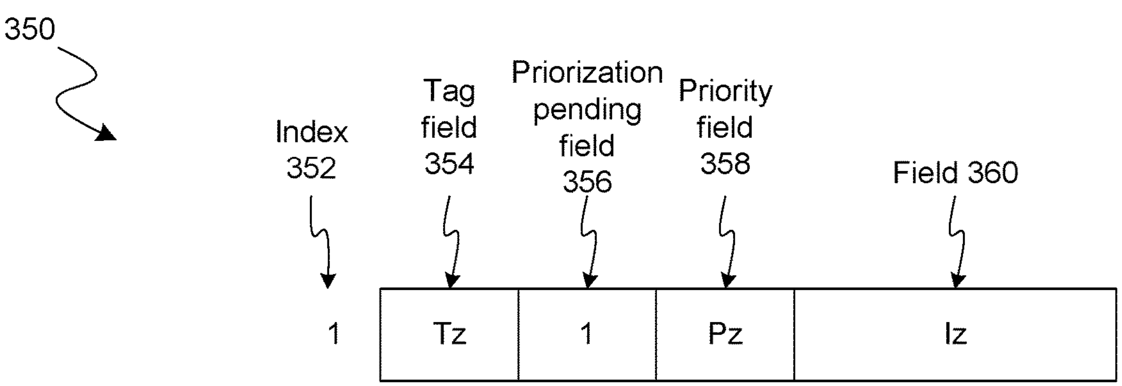
FIG. 3B
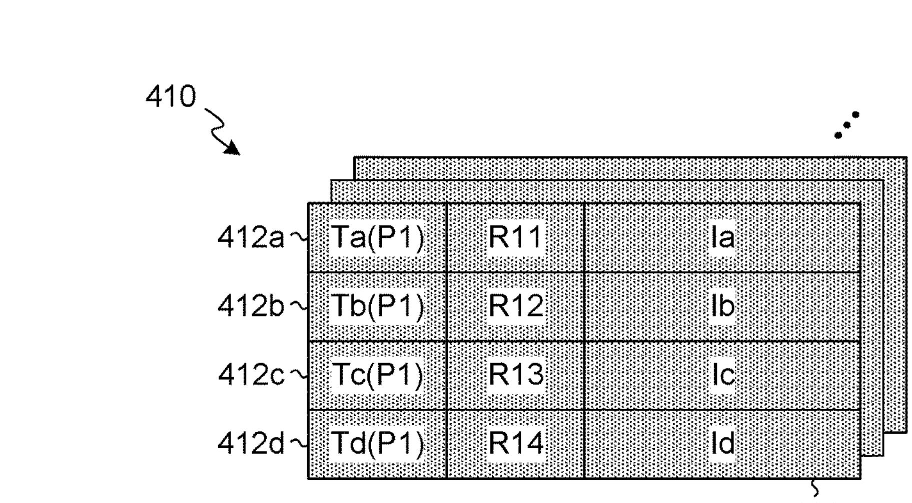
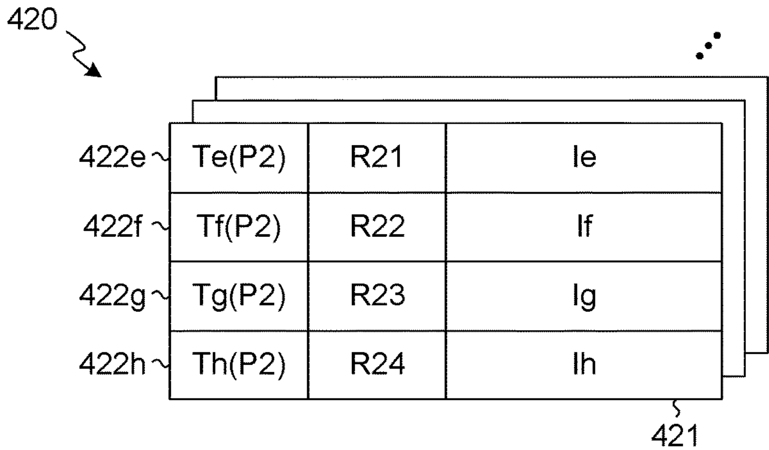
FIG. 4

610

Based on a miss of a first cache, search a second cache which comprises second multiple entries which each correspond to a different respective instruction

612

Perform an assignment of a third priority level to a second entry of the second multiple entries based on a second retirement event, wherein a second prioritization scheme comprises the third priority level and a fourth priority level

614

Perform a search to determine whether a target instruction is to be prefetched from the second cache, wherein, based on the second prioritization scheme, any entry selected by the search is one of the one or more entries which are each assigned the third priority level

FIG. 6

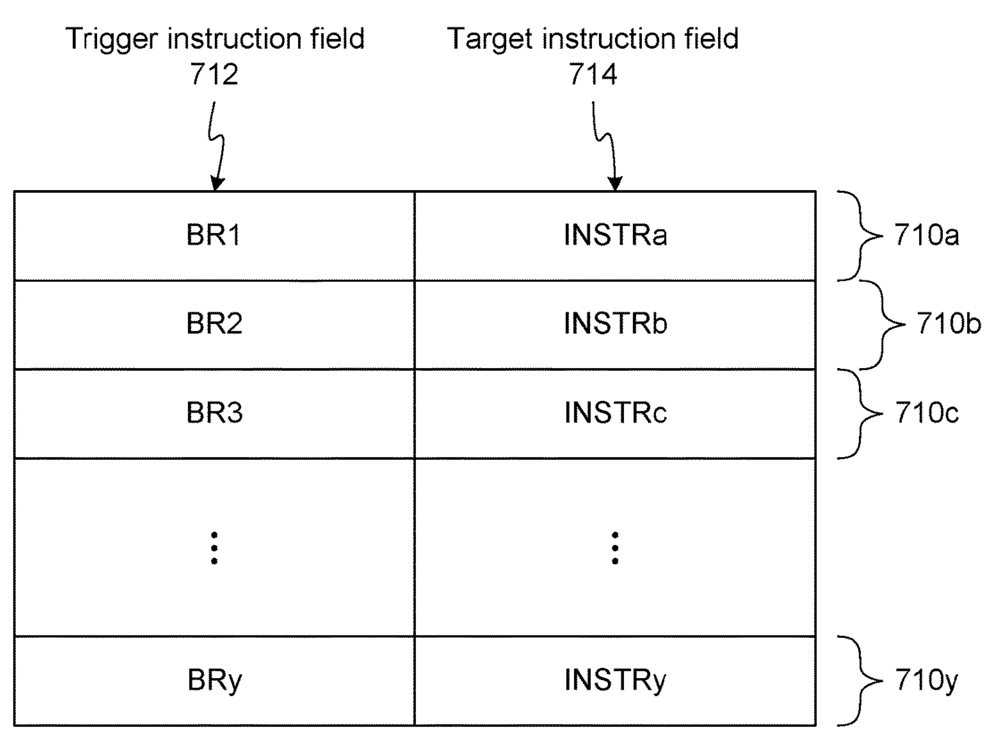
FIG. 7

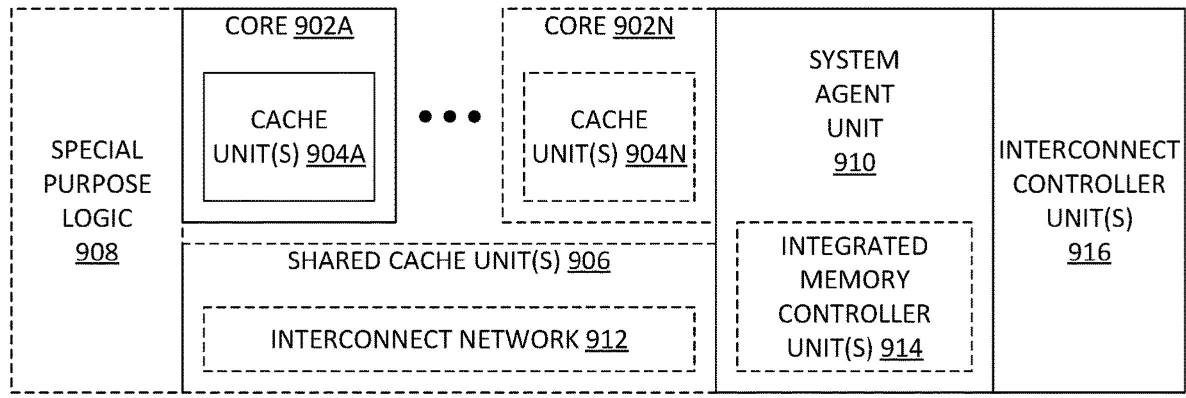
FIG. 9

| Prefix(es) 1301 | Opcode 1303 | Addressing 1305 | Displacement 1307 | Immediate 1309 |
| --- | --- | --- | --- | --- |

FIG. 15

Prefix 1301(A)

| 7 | 6 | 5 | 4 | 3 | 2 | 1 | 0 |
|---|---|---|---|---|---|---|---|
| 0 | 1 | 0 | 0 | W | R | X | B |

Prefix 1301(A)
Opcode 1303
MOD R/M 1402
MOD 1442 | Reg 1444 | R/M 1446
!=11 | rrr | bbb
Rrrr
Bbbb

FIG. 16A

Prefix 1301(A)
Opcode 1303
MOD R/M 1402
MOD 1442 | Reg 1444 | R/M 1446
11 | rrr | bbb
Rrrr
Bbbb

FIG. 16B

Prefix 1301(A)
Opcode 1303
MOD R/M 1402
MOD 1442 | Reg 1444 | R/M 1446
!=11 | rrr | 100
SIB 1404
SCL 1452 | Index 1454 | Base 1456
 | xxx | bbb
Rrrr
Xxxx
Bbbb

FIG. 16C

Prefix 1301(A)
Opcode 1303
MOD R/M 1402
Reg 1444
bbb
Bbbb

FIG. 16D

PRIORITIZING ENTRIES OF AN INSTRUCTION FETCH RESOURCE AFTER STALL-RETIREMENT EVENTS

BACKGROUND

1. Technical Field

This disclosure generally relates to processor circuitry and more particularly, but not exclusively, to the prioritization of instructions which are to be made available for use in a processor core

2. Background Art

Despite recent advances in microprocessor design, achieving high performance thread execution, even in the multicore era, remains challenging in many ways. This is particularly true for emerging datacenter and cloud applications, which tend to experience a large number of stalls in the front-end engines of processor cores. In many cases, these stalls are due at least in part to applications that exhibit large code footprints, which are often on the order of several hundreds of megabytes (MBs). It is not uncommon for a large code footprint to cause hundreds of misses per kilo instructions (MPKI), which can account for more than thirty percent (30%) of front-end stalls in a given core.

As successive generations of processor architectures are expected to support increasingly large and varied types of software loads, there is an increasing premium placed on solutions to mitigate the frequency of front-end stalls in a processor core.

BRIEF DESCRIPTION OF THE DRAWINGS

The various embodiments of the present invention are illustrated by way of example, and not by way of limitation, in the figures of the accompanying drawings and in which:

FIG. 2 shows a flow diagram illustrating features of a method to prioritize an entry of an instruction fetch resource according to an embodiment.

FIG. 3A shows a format diagram illustrating features of a cache which comprises variously prioritized entries according to an embodiment.

FIG. 3B shows a format diagram illustrating an entry of an instruction fetch resource according to an embodiment.

FIG. 4 shows a format diagram illustrating features of a cache to prioritize an entry of an instruction fetch resource according to an embodiment.

FIG. 6 shows a flow diagram illustrating features of a method to prioritize entries of a cache according to an embodiment.

FIG. 7 shows a format diagram illustrating features of a table to facilitate the prefetching of an instruction from among prioritized cache entries according to an embodiment.

FIG. 9 illustrates a block diagram of an example processor that may have more than one core and an integrated memory controller.

FIG. 15 illustrates examples of a first prefix.

FIGS. 16A-D illustrate examples of how the R, X, and B fields of the first prefix in FIG. 15 are used.

DETAILED DESCRIPTION

Figure 1:
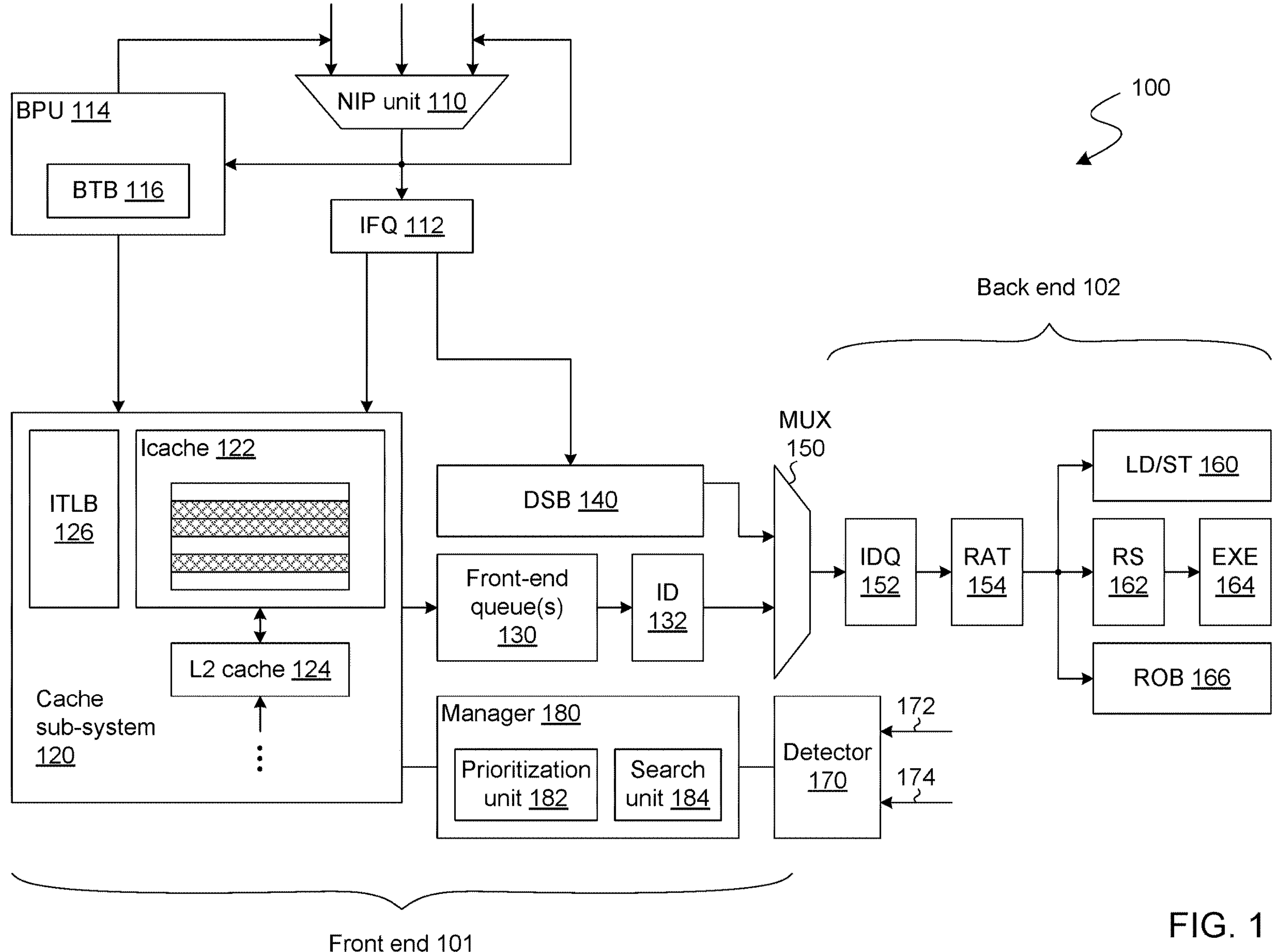
FIG. 1 shows a functional block diagram illustrating features of a processor core to fetch a version of an instruction for execution according to an embodiment.

Embodiments discussed herein variously provide techniques and mechanisms for implementing or otherwise utilizing a processor core management functionality which is referred to herein as "priority promotion at retirement" (or "PPR"). Such functionality determines and/or uses a prioritization according to which an entry of an instruction fetch resource is to be a candidate (or, alternatively, is to be prevented from being such a candidate) for eviction from the instruction fetch resource.

As used herein. "instruction fetch resource" refers to a repository of information which facilitates the fetching—e.g., by front end circuitry of a processor core—of at least some version of an instruction that is to be executed. Such information is searched or otherwise accessed by a front end of a processor core based on a next instruction pointer or any of various other suitable identifiers of one instruction in a sequence of instructions which are executed with the core. For example, an instruction fetch resource comprises multiple entries which each include, or otherwise correspond to, a different respective instruction. The multiple entries are subject to being searched or otherwise accessed for determining a decoded instruction that is to be executed. By way of illustration and not limitation, an entry of an instruction fetch resource comprises a version of an instruction, or (for example) address information which specifies or otherwise indicates a location of such a version.

In an illustrative scenario according to one embodiment, the front end of such a core fetches—e.g., prefetches—a cached version of an instruction which is to be subsequently decoded. In another scenario, the front end fetches a previously-decoded instruction—e.g., (pre)fetches one or more microoperations which are to be performed, in sequence, to implement an execution of the instruction.

In some embodiments, an instruction fetch resource is an instruction cache (Icache), or any of various other suitable caches which are available to cache the respective versions of at least some instructions. For example, in one embodiment, multiple entries of an instruction fetch resources each comprise a different respective line, block, way or other portion of an Icache. Additionally or alternatively, an instruction fetch resource is an instruction translation lookaside buffer (iTLB)—e.g., wherein multiple entries of the iTLB each comprise or otherwise indicate at least some address translation information for a corresponding one or more lines of a cached instruction. Additionally or alternatively, an instruction fetch resource is a branch target buffer (BTB)—e.g., wherein multiple entries of the BTB each specify or otherwise indicate both a respective branch instruction, and a respective instruction which has been predicted to be targeted based on an execution of said branch instruction. For example, a BTB entry comprise address information, instruction pointer values and/or other suitable information to identify both a branch instruction and a corresponding predicted target instruction. Additionally or alternatively, an instruction fetch resource is a decoded stream buffer (DSB) (e.g., a decoded instruction cache), wherein multiple entries of the DSB each include a respective one or more microoperations of a corresponding previously-decoded instruction. For illustrative purposes, certain features of various embodiments are described herein with reference to the prioritization of entries of an instruction fetch resource which is an instruction cache. However, it is to be appreciated that such description can be extended to additionally or alternatively apply to the prioritization of entries of any of various other types of instruction fetch resources.

Some embodiments variously provide PPR functionality based on a prioritization scheme which includes a first priority level and a second priority level. In one such embodiment, the first priority level corresponds to a relatively high priority for keeping a given entry in the instruction fetch resource—e.g., wherein the second priority level would otherwise correspond to a relatively low priority for keeping that same entry in the instruction fetch resource. By way of illustration and not limitation, in some embodiments, for any entry which is currently at the first prioritization level, the entry has at least some corresponding protection from eviction from the instruction fetch resource. By contrast, for any entry which is currently at the second prioritization level, the entry does not have that eviction protection. Unless otherwise indicated, "level of priority" (or, for brevity, simply "priority") is understood to refer herein to a given priority level of a prioritization scheme. Furthermore, "entry" is understood to refer to an entry of an instruction fetch resource, unless otherwise indicated.

As used herein in the context of entry prioritization, "promotion," "promote," "promoted." "promoting." and related terms are understood to refer to the characteristic of a given entry being assigned, or currently having (being at), a relatively high priority of a prioritization scheme. Correspondingly, "demotion," "demote," "demoted," "demoting." and related terms are understood to refer to the characteristic of a given entry being assigned, or currently having, a relatively low priority of the prioritization scheme. For example, "promoted entries" refers herein to those one or more entries of an instruction fetch resource which, at the time in question, are currently assigned a relatively high priority of a PPR prioritization scheme. By contrast, "demoted entries" refers herein to those one or more entries of an instruction fetch resource which, at the time in question, are currently assigned a relatively low priority of the PPR prioritization scheme.

In various embodiments, an entry is assigned a relatively high priority level based on a type of event which is referred to herein as a "stall-retire event." A stall-retire event occurs when an instruction is retired from (successful or unsuccessful) execution by a processor core, wherein a front end of the processor experienced a stall based on operations to facilitate said execution of the instruction. In one such embodiment, the stall is caused (for example) based at least in part on a miss of an instruction fetch resource.

FIG. 1 shows features of a processor core 100 to provide instruction fetch functionality according to an embodiment. The core 100 illustrates one example of an embodiment which prioritizes an entry of an instruction fetch resource based on a stall-retire event, wherein the prioritization is at least one basis for determining whether the entry is to be a candidate for eviction from the instruction fetch resource.

In an embodiment, core 100 includes an out-of-order processor core, or (alternatively) an in-order processor core. However, core 100 is adapted from any of various suitable types of cores, such as a native core, a software managed core, a core adapted to execute a native Instruction Set Architecture (ISA), a core adapted to execute a translated Instruction Set Architecture (ISA), a co-designed core, or other known core.

Core 100 comprises a front end 101 and a back end 102, wherein front end 101 provides functionality to fetch instructions in an instruction sequence which is to be executed with back end 102. The instruction sequence is indicated by information—such as a sequence of instruction pointers—which is provided to or otherwise determined by front end 101. Based on a given instruction pointer, circuitry of front end 101 fetches (in some instances, prefetches) at least some version of the corresponding instruction. For example, front end 101 fetches a version of the instruction which is in memory, a cached version of an instruction, or a previously decoded version of the instruction.

In an embodiment, an instruction pointer generation stage of front end 101 selects instruction pointers (e.g., memory addresses) which identify the next instruction that is to be fetched and executed by core 100 as part of an executing program sequence. In one embodiment, the instruction pointer generation stage increments the memory address of the most recently fetched instruction by a predetermined amount X (e.g., 1), each clock cycle. In the example embodiment illustrated by FIG. 1, the instruction pointer generation stage comprises a next instruction pointer (NIP) unit 110, and a branch prediction unit (BPU) 114 which includes (or alternatively, is coupled to) a branch target buffer (BTB) 116.

The NIP unit 110 comprises circuitry which is operable to determine a next instruction pointer (IP) after the current IP in an executing sequence of instructions—e.g., where (for example) the current IP refers to an instruction which is currently being prepared for execution. In the example embodiment shown, NIP unit 110 outputs an IP value to BPU 114 to facilitate the prediction of a branch to be taken in the executing sequence of instructions. In certain embodiments, BTB 116 is coupled to store (e.g., in a branch predictor array) predicted target instructions which each correspond to a different respective branch instruction (e.g., one of multiple branch instructions of a section of code that has been executed multiple times). Some or all of NIP unit 110, BPU 114 and BTB 116 variously provide functionality which (for example) is adapted from conventional processor techniques for branch prediction and/or other features of instruction pointer generation. To avoid obscuring certain features of various embodiments, such conventional processor techniques are not detailed herein (and are not limiting on said embodiments).

A fetch stage of front end 101 accepts instruction pointers from the instruction pointer generation stage, and fetches instructions based on said pointers—e.g., wherein an instruction is (pre)fetched from a cache sub-system 120 or from a memory (not shown) which is coupled to, or is a component of, core 100. In one such embodiment, cache sub-system 120 is available to provide cached versions of instructions, data and/or other information which (for example) is also in the memory. For example, cache sub-system 120 comprises an instruction cache (Icache) 122, and an instruction translation lookaside buffer (ITLB) 126 which facilitates address translation to determine an address of an instruction which is to be fetched. Although some embodiments are not limited in this regard, cache sub-system 120 further comprises one or more other caches, such as the illustrative second level (L2) cache 124 shown. In an embodiment, cache sub-system 120 further comprises circuitry which manage the selective caching of instructions, data, and/or other information in Icache 122, L2 cache 124 and/or other cache resources (not shown).

In the example embodiment shown, the fetch stage comprises an instruction fetch queue (IFQ) 112 and, for example, Icache 122, and/or the illustrative one or more front-end queues 130 shown. In one such embodiment, NIP unit 110 selects an IP from a set of inputs, and provides the selected IP to IFQ 112 (e.g., as well as to BPU 114). Based on the selected IP, IFQ 112 fetches and enqueues a corresponding instruction—e.g., wherein IFQ 112 provides the instruction to the one or more front-end queues 130, or signals the one or more front-end queues 130 to enqueue an instruction from Icache 122.

A decode stage of front end 101 performs operations to decode an instruction into a decoded instruction which (for example) comprises one or more micro-operations. In the example embodiment shown, the decode stage comprises an instruction decoder (ID) 132 which is coupled to receive instructions—e.g., from the one or more front-end queues 130. Circuitry of ID 132 is operable to perform various instruction decode operations, each to generate a respective one or more decoded instructions. Although some embodiments are not limited in this regard, a decoded stream buffer (DSB) 140 (or a micro-operation cache, for example) of front end 101 further provides a repository of micro-operations (micro-operations) generated by previously decoded instructions.

An execution stage of back end 102 performs an operation as specified by a given decoded instruction. In the example embodiment shown, the execution stage comprises one or more execution units (EXE) 164 which (for example) are coupled to ID 132 via some or all of a merge multiplexer (MUX) 150, an instruction decode queue (IDQ) 152, and a register alias table (RAT) 154. In the example embodiment shown, MUX 150 is coupled to variously receive decoded instructions from ID 132, and is further coupled to receive from DSB 140 one or more micro-operations of a previously decoded instruction.

For example, an instruction pointer, provided by IFQ 112, specifies or otherwise indicates a particular instruction to DSB 140. Where it is determined that DSB 140 has a cached version of one or more micro-operations which correspond to that particular instruction—e.g., from a previous instance of the instruction having been decoded—then DSB 140 provides the corresponding one or more micro-operations to MUX 150. In one such embodiment, MUX 150 variously provides decoded instructions, each from a respective one of ID 132 or DSB 140, for execution by EXE 164.

By way of illustration and not limitation, back end 102 further comprises a load/store unit (LD/ST) 160, a reservation station (RS) 162, and/or a reorder buffer (ROB) 166, although some embodiments are not limited in this regard. In one such embodiment, MUX 150 transfers a stream of micro-operations—which are variously provided each from a respective one of ID 132 or DSB 140—to EXE 164 (e.g., via IDQ 152, RAT 154, and RS 162). In one such embodiment, RS 162 orders, groups and/or otherwise arranges micro-operations for provisioning to EXE 164—e.g., where such provisioning is according to different functional units (including, for example, an integer execution unit, a floating point execution unit, a memory execution unit, an address generation unit, and/or the like) of EXE 164.

It is to be appreciated that core 100 (or, for example, the core 500 which is also described herein) is merely illustrative of one processor core architecture which facilitates the prioritization of entries of an instruction fetch resources. In different embodiments, any various other architectures—including some existing core architectures—are adapted to similarly support the determination and/or use of such prioritization.

Core 100 provides PPR functionality which determines and/or uses various respective priorities of multiple entries of an instruction fetch resource. Some or all such priorities are used, for example, as a basis for determining whether a given one of the multiple entries qualifies to be a candidate for eviction from the instruction fetch resource. In some embodiments, additional prioritization functionality is provided to selectively qualify a given cache entry to be (or alternatively, disqualify said cache entry from being) a candidate for providing a respective instruction in a prefetch. To illustrate certain features of various embodiments, PPR functionality of core 100 is described with reference to the prioritization of entries of instruction cache 122. However, in some embodiments, PPR functionality is additionally or alternatively provided by core 100 to prioritize multiple entries of one of ITLB 126, BTB 116, DSB 140 and/or any of various other suitable instruction fetch resources.

In the example embodiment shown, core 100 comprises a detector 170 which includes circuitry to detect a stall-retirement event—e.g., an event wherein a first instruction has been retired after a stall of front end 101, and wherein the stall is based on operations by front end 101 to fetch, decode and/or otherwise prepare the first instruction for execution by back end 102. In some existing processor architectures, a front end of a core is often able to variously "hide" (e.g., mitigate an effect of, or otherwise adjust for) latencies which are due to certain types of cache misses. However, other cache miss types are relatively difficult to hide—e.g., where a cache miss follows a clear event, such as one resulting from a branch misprediction, or an ITLB miss (which can cause a clear event). For example, hiding such latency is often difficult because various front end queues are empty after the clear event, which increases the time needed to find instructions to fetch while waiting for the miss to resolve. Some embodiments variously improve on these previous architectures by using stall-retirement events as a basis for selectively prioritizing instruction fetch resource entries.

By way of illustration and not limitation, detector 170 is coupled to receive an indication 172 that front end 101 has experienced said stall—e.g., wherein indication 172 specifies or otherwise indicates an association of the stall with the first instruction. Indication 172 is provided, for example, by cache sub-system 120—e.g., in response to cache sub-system 120 detecting a miss of a cache, such as Icache 122 (where said miss occurs in the search for a cached version of the first instruction), where said miss is a basis for a stall of front end 101. Additionally or alternatively, indication 172 is provided, for example, based on a miss of DSB 140, or any of various other suitable repositories of instructions (decoded or otherwise), where said miss is a basis for a stall of front end 101.

In one such embodiment, detector 170 is further coupled to receive another indication 174 that the same first instruction has been retired from successful (or, for example, unsuccessful) execution. Indication 174 specifies or otherwise indicates to detector 170 that it is the first instruction which has been retired—e.g., wherein execution unit 164 (and/or any of various other suitable circuit resources of back end 102) provides indication 174. Based on indications 172, 174, detector 170 identifies the first instruction, to a manager 180 of core 100, as being the subject of a stall-retirement event. Manager 180 comprises an application specific integrated circuit (ASIC), programmable gate array circuitry, microcontroller logic, and/or any of various other suitable circuit resources which are adapted to determine a prioritization of entries of an instruction fetch resource.

In an embodiment, a prioritization unit 182 of manager 180 selectively prioritizes entries of Icache 122 according to a prioritization scheme which includes a first (relatively high) priority level and a second (relatively low) priority level. The first priority level is to exclude a given entry from being a candidate for selection for eviction from Icache 122—where such selection is performed by at least one type of search of Icache 122. By contrast, the second priority level is instead to include a given entry as a candidate for selection for eviction from Icache 122.

In an illustrative scenario according to one embodiment, prioritization unit 182 assigns the first priority to a first entry of Icache 122 based on the stall-retirement event detected by detector 170—e.g., wherein the first entry includes a cached version of the first instruction which is associated with the stall-retirement event. By way of illustration and not limitation, Icache 122 is modified so that the first entry is created, updated or otherwise accessed to provide a cached version of the first instruction. In one such embodiment, the assigned first priority is specified or otherwise indicated by a location of the first entry in Icache 122, by metadata which is included in (or otherwise associated with) the first entry, and/or the like. Accordingly, at a given time during operation of core 100, a first one or more entries of Icache 122 (which are represented as shaded in FIG. 1) are each currently assigned the first priority level, while one or more other entries of Icache 122 (which are represented as non-shaded in FIG. 1) are each currently assigned the second priority level.

In an embodiment, a search unit 184 of manager 180 (or, for example, suitable circuit logic of cache sub-system 120) is adapted to search Icache 122 to select a victim entry which to be evicted therefrom. Such selection is performed based on the prioritization scheme which is provided with prioritization unit 182 based on stall-retirement events. For example, a search to identify a victim entry is performed while a first one or more entries of Icache 122 are each assigned the first (high) priority level, and while a second one or more entries of Icache 122 are each assigned the second (low) priority level. In one such embodiment, the victim entry is selected from among only the second one or more entries—e.g., wherein the first one or more entries are excluded from the search (or are otherwise prevented from being selected by the search) by virtue of their being currently promoted to the first priority level. By way of illustration and not limitation, the victim entry is selected from among only the second one or more entries based on some other criteria—e.g., including as recency of use criteria, an additional prioritization scheme, and/or the like—according to which some or all of the second one or more entries are to be distinguished from each other.

In various embodiments, prioritization unit 182 (or other suitable circuitry of manager 180) further provides functionality to selectively demote a given entry of Icache 122 from the first priority level to the second priority level. Such demotion is performed, for example, based on the assignment of the first priority level to another entry which (for example) is being added to Icache 122, or which had been assigned the second priority level. In another embodiment, such demotion is performed based some predetermined criteria which ages out the entry in question to limit a duration of said entry being classified as high priority.

In various embodiments, manager 180 implements or uses a first partition (such as a first one or more ways) of Icache 122, which is dedicated to provide only entries which are each currently assigned the first priority level—e.g., wherein a second partition (such as a second one or more ways) of Icache 122 are dedicated to provide only entries which are each currently assigned the second priority level. For example, prioritization unit 182 creates high priority entries only in the first partition, and/or promotes entries by moving them from the second partition to the first partition. In one such embodiment, prioritization unit 182 (or other suitable logic of manager 180) provides functionality to dynamically change the size of some or all such partitions. For example, manager 180 increases a size of the first partition where it is determined (according to some predetermined criteria) that some performance threshold is being exceeded—e.g., by a number of stalls, a frequency of stalls, or the like.

FIG. 2 shows a method 200 for prioritizing an entry of an instruction fetch resource according to an embodiment. Method 200 illustrates one example of an embodiment wherein a given entry, which includes or otherwise corresponds to a particular instruction, is assigned a prioritization level which determines (at least in part) an eligibility for that entry to be evicted from the instruction fetch resource. Operations such as those of method 200 are performed with any of various suitable hardware (e.g., circuitry) and/or executing software which, for example, provides some or all of the functionality of manager 180 and/or other components of core 100.

As shown in FIG. 2, method 200 comprises (at 210) searching multiple entries of an instruction fetch resource to detect a location of a version of a first instruction. In some embodiments, the instruction fetch resource is an instruction cache, for example. In other embodiments, the instruction fetch resource is a translation lookaside buffer (such as ITLB 126), a decoded stream buffer, a branch target buffer, or any of various other suitable resource which facilitate the fetching of an instruction for execution with a back end of a processor core.

In an embodiment, the multiple entries of the instruction fetch resource each correspond to a different respective instruction, wherein a first entry of the multiple entries corresponds to the first instruction. For example, the searching at 210 is to determine whether an entry of the instruction fetch resource includes a cached and/or previously decoded version of the first instruction. Alternatively, the searching at 210 is to determine whether an entry of the instruction fetch resource includes address translation information which facilitates the locating of such a version at another instruction fetch resource.

In some embodiments, the searching at 210 is performed based on an instruction pointer which specifies or otherwise indicates the first instruction. By way of illustration and not limitation, the instruction pointer identifies the first instruction, for example. Alternatively, the instruction pointer identifies a branch instruction, wherein (according to a branch prediction resource of the processor which performed method 200) the first instruction is a predicted target instruction to be executed based on a result of the execution of the branch instruction.

Method 200 further comprises (at 212) assigning to the first entry a first priority level of a prioritization scheme which includes the first priority level and a second priority level. In an embodiment, the first priority level is assigned to the first entry based on a retirement event (or "stall-retirement event" herein) wherein the first instruction is retired after a stall of the processor with which method 200 is performed. In one such embodiment, the stall is based on the first instruction—e.g., wherein the stall is based on a miss of the instruction fetch resource (the miss is based on a search for the first instruction), and/or is otherwise based on a delay in accessing data requested by the instruction.

The assigning at 212 increases a prioritization of the first entry—and, correspondingly, of the first instruction which is currently indicated by the first entry—or, for example, assigns a relatively high priority as part of the creation of the first entry. For example, the assigning at 212 is to prevent—at least temporarily—an eligibility of the first entry for eviction from the instruction fetch resource In some embodiments, the assigning at 212 comprises updating a prioritization field of the first entry (or of some other reference information which corresponds to the first entry). In other embodiments, the instruction fetch resource comprises both a first (physical or virtual) partition, which corresponds to the first priority level, and a second (physical or virtual) partition which corresponds to the second priority level. In one such embodiment, the assigning at 212 comprises creating the first entry in the first partition, or moving the first entry from the second partition to the first partition.

Method 200 further comprises (at 214) performing a selection of a victim entry to be evicted from the instruction fetch resource. The selection is performed at 214 based on the prioritization scheme while a first one or more entries of the multiple entries are each assigned the first priority level, and while a second one or more entries of the multiple entries are each assigned the second priority level. In an embodiment, the victim entry is selected from among only the second one or more entries—e.g., wherein the first priority level prevents each of the first one or more entries from being targeted by the selection which is performed at 214.

For example, in some embodiments, the selection at 214 is based on some additional criteria—e.g., comprising another prioritization scheme—according to which the second one or more entries (at least) are to be ranked relative to each another. In one such embodiment, this criteria includes a recency of use metric such as one which is adapted from any of various conventional cache management techniques for identifying a best (e.g., least recently used) cache line for eviction.

FIG. 3A shows features of a cache 300 comprising entries which are variously prioritized according to an embodiment. Cache 300 illustrates one example of an instruction fetch resource of a processor core, where said resource facilitates the retrieval of instructions to be executed with a back end of the core. In some embodiments, multiple entries of such an instruction fetch resource are each assigned a respective one of a first priority level or a second priority level, wherein said prioritization is a basis for determining which entries are to be candidates for eviction. For example, one or more entries are assigned a relatively high priority level each based on a different respective stall-retirement event. In various embodiments, cache 300 provides functionality such as that of Icache 122 or L2 cache 124—e.g., wherein one or more operations of method 200 are performed with cache 300.

As shown in FIG. 3A, cache 300 is an instruction fetch resource comprising multiple entries 310*a* . . . 310*x*—e.g., multiple cache lines—to store versions of instructions (and in some embodiments, data and/or other information) which, for example, have previously been fetched by a processor which includes cache 300. A given entry 310—i.e., a particular one of entries 310*a*, . . . 310*x*—comprises a respective field 320 which is to provide a cached version of an instruction (or other suitable payload information). For example, such a field 320 comprises information tracked by that given entry 310, where said information is a version of information which is stored at a corresponding address in a system memory.

One method for accessing an instruction that is held in cache 300 is to select a given entry 310 using a corresponding index 312 which, for example, is identified based on an address (virtual or physical), an instruction pointer and/or other suitable information. For example, entries 310*a*, . . . 310*x* each comprise a tag field 314 which is to provide respective tag information that is to be compared with a tag value that is computed from address information, instruction pointer information, or the like. If the information in the tag field 314 for the given entry 310 matches the computed tag, then the entry 310 is the correct one for the given address or pointer. Otherwise, the given entry 310 is not the correct one, and (for example) the indicated instruction is instead to be fetched from a lower level cache, a system memory or other suitable resource. In some embodiments, the index 312 of a given entry 310 is implicit based on a position of that entry 310 in cache 300.

In various embodiments, entry 310 further comprises a status field (not shown) which indicates the cache coherence protocol state for entry 310—e.g., wherein the state is one of a modified state, an exclusive state, a shared state, an invalid state, or another state provided according to any of various conventional cache coherency protocol techniques.

In some embodiment, some or all entries of cache 300 are subject to being variously prioritized according to a prioritization scheme which includes a first (relatively high) priority level, and a second (relatively low) priority level. The first priority level is to protect a given entry 310 from at least one type of selection for eviction from cache 300—e.g., wherein the second priority level enables such selection.

Accordingly, at a given time during operation of a processor core which includes cache 300, a first one or more entries of cache 300 are each assigned the first (high) priority level, while a second entries one or more of cache 300 are each assigned the second (low) priority level. For a given one of the first one or more entries, the entry is assigned the first priority level based on a stall-retirement event for an instruction, a version of which is in the respective field 320 of that entry. A given entry is assigned the second priority level, in some embodiments, where (for example) the entry is demoted to make for a different entry to have the first priority level. Additionally or alternatively, a given entry is assigned the second priority level where (for example) an instruction is to be cached with the entry, but the instruction in question has yet to be the subject of a stall-retirement event.

In the example embodiment shown, the first one or more entries comprise the (shaded) entries 310*a*, 310*c*, 310*d* and 310*f*, and the second first one or more entries comprise the (non-shaded) entries 310*b*, 310*e*, and 310*x*. For example, the priority field 316 of entry 310*a* is set to a value P1 which represents the first priority level, which is assigned to entry 310*a* based on a stall-retirement event for an instruction Ia which is provided in the field 320 of entry 310*a*. Similarly, the priority fields 316 of entries 310*c*, 310*d*, 310*f* are each set to the value P1, based on respective stall-retirement events for instructions Ic, Id, If, which are variously provided in the fields 320 of entries 310*c*. 310*d*. 310*f*. By contrast, the priority fields 316 of entries 310*b*, 310*e*, 310*x* are each set to a value P2 which represents the second priority level.

In an illustrative scenario according to one embodiment, a search of cache 300 is performed to identify a victim entry which is to be evicted from cache 300. Such an eviction is to be performed, for example, based on a condition wherein cache 300 is full, and an entry needs to be made available for caching a version of a different instruction. By way of illustration and not limitation, the different instruction is to be cached at cache 300 based on a fetching of the instruction from a system memory or other such repository. Additionally or alternatively, the different instruction is to be cached (for example) based on a stall-retirement event for said different instruction.

In various embodiments, a search for a victim entry is performed based on the prioritization scheme—e.g., wherein the priority level indicated by the value P1 precludes the possibility that any of entries 310*a*, 310*c*, 310*d*, 310*f* are selected for eviction from cache 300. In one such embodiment, such a search is limited to only the second one or more entries of cache 300 which are currently assigned the second (relatively low) priority level.

FIG. 3B shows an entry 350 of an instruction fetch resource which is prioritized to enable (or disable) selection as a victim entry according to an embodiment. Entry 350 illustrates one embodiment which allows the delaying of a determination as to whether a high priority level is to be assigned based on a stall-retirement event. In various embodiments, entry 350 is an entry of a cache (such as one of Icache 122, L2 cache 124 or cache 300, for example)—e.g., wherein operations of method 200 access and/or are otherwise based on information in entry 350.

As shown in FIG. 3B, entry 350 comprises an index 352, a tag field 354, a priority field 358, and a field 360 which, for example, correspond functionally to index 312, tag field 314, priority field 316, and field 320 (respectively). Field 360 includes a cached version of an instruction Iz which is available to be fetched by a front end of a core. Tag field 354 includes a value Tz which facilitates fetching of the instruction Iz from entry 350—e.g., wherein the value Tz is equal to or otherwise based on a physical (or virtual) address, an instruction pointer and/or other information suitable for selecting entry 350. The priority field 358 of entry 350 facilitates the provisioning of a value Pz which represent a priority level that is assigned to entry 350 (and, correspondingly, to the instruction Iz). In some embodiments, entry 350 omits priority field 358—e.g., wherein index 352 and/or a location of entry 350 in a cache implicitly identifies a particular level of prioritization of instruction Iz.

In the example embodiment shown, entry 350 further comprises a prioritization pending field 356 which specifies or otherwise indicates whether the current value Pz of priority field 358 is valid—e.g., wherein a value of prioritization pending field 356 indicates whether a reevaluation (if any) of the priority level is currently pending.

By way of illustration and not limitation, setting prioritization pending field 356 to a first value (e.g., "1") indicates that the current value Pz of priority field 358 is at least temporarily invalid. Prioritization pending field 356 is set to the first value, for example, in response to a stall-retirement event associated with instruction Iz, but before additional processing which determines, based on the stall-retirement event, whether or how entry 350 is moved, modified or otherwise updated to indicate a different prioritization level. In some embodiments, while prioritization pending field 356 is set to the first value, entry 350 is automatically excluded (or, in other embodiments, included), by default, as a candidate for eviction.

For example, any possible eviction of entry 350 is disabled, delayed or otherwise suspended until the value of prioritization pending field 356 is equal to a different value (e.g., "0") which indicates that the value of priority field 358 is currently valid. Accordingly, some embodiments variously enable a "slow" version of entry promotion—e.g., wherein entry 350 does not have to be moved, updated or otherwise accessed for (re)prioritization upon the detection of a stall-retirement of instruction Iz. Instead, such accessing of entry 350 can take place at some later time which is convenient for processor operations—e.g., wherein multiple entries of an instruction fetch resource are variously reprioritized together in a batch operation. In some other embodiments—e.g., where such slow entry promotion is not provided-entry 350 instead omits the prioritization pending field 356.

FIG. 4 shows features of a cache 400 to facilitate a relative prioritization of instruction fetch information according to an embodiment. The cache 400 illustrates one example of an embodiment wherein different portions of an instruction fetch resource (e.g., different physical partitions, or different virtual partitions) are to be associated each with a different respective priority level of a prioritization scheme. In various embodiments, cache 400 provides functionality such as that of Icache 122, L2 cache 124, or cache 300—e.g., wherein one or more operations of method 200 are performed with cache 400.

As shown in FIG. 4, cache 400 comprises one or more ways 410 which are each dedicated to correspond to a first priority level of a prioritization scheme. For any entry (e.g., any block, cache line, or the like) of way(s) 410, the entry is implicitly assigned the first priority level by virtue it being located in way(s) 410. In one such embodiment, cache 400 further comprises one or more other ways 420 which are each dedicated to correspond to a second priority level of the prioritization scheme. For any entry of way(s) 420, the entry is implicitly assigned the second priority level by virtue it being located in way(s) 420. Accordingly, way(s) 410 and way(s) 420 function as respective partitions each for a different level of priority. At least with respect to the selection of a victim entry for eviction from cache 400, the first priority level is a relatively high prioritization, as compared to the second priority level.

In an illustrative scenario according to one embodiment, a way 411 of the way(s) 410 comprises entries 412*a*, 412*b*, 412*c*, 412*d*, and another way 421 of the way(s) 420 comprises entries 422*e*, 422*f*, 422*g*. 422*h*. Entries 412*a*, 412*b*, 412*c*, 412*d* include cached versions of instructions Ia, Ib, Ic, Id (respectively), and are addressed or otherwise identifiable by respective tag values Ta. Tb, Tc, Td. Furthermore, entries 412*a*, 412*b*, 412*c*, 412*d* are each implicitly assigned the first prioritization level (represented as P1) by virtue of their being in the corresponding way(s) 410. By contrast, entries 422*e*, 422*f*, 422*g*, 422*h* include cached versions of other instructions Ie, If, Ig, Ih (respectively), and are addressed or otherwise identifiable by respective tag values Te, Tf, Tg, Th. Entries 422*e*, 422*f*, 422*g*, 422*h* are each implicitly assigned the second prioritization level (represented as P2) by virtue of their being in the corresponding way(s) 420. As a result, some embodiments variously perform a search to identify a victim entry which is to be evicted from cache 400. In one such embodiment, entries of way(s) 410 are ineligible to be selected by such a search—e.g., wherein the search is limited to only some or all of the entries of way(s) 420.

In some embodiments, cache 400 provides additional information which further facilitates the use of one or more criteria according to which some or all entries are to be ranked relative to each other. In one such embodiment, the additional information includes recency of use metrics for at least ranking entries of way(s) 420 relative to each other.

By way of illustration and not limitation, entries 422*e*, 422*f*, 422*g*, 422*h* comprise values R21, R22, R23, R24 which variously indicate the recency of use for instructions Ie, If, Ig, Ih (respectively). Some embodiments select a victim entry from among entries of way(s) 420 based on the recency of use values R21, R22, R23, R24—e.g., wherein the victim entry is a least recently used of all such entries.

In one such embodiment, entries 412*a*, 412*b*, 412*c*. 412*d* similarly comprises values R11, R12, R13, R14 which variously indicate the recency of use for instructions Ia, Ib, Ic. Id (respectively). Some embodiments search from among entries of way(s) 410 to select—based on the recency of use values R11, R12, R13, R14—an entry which is to be demoted from the first priority level to the second priority level. In one such embodiment, the selected entry is moved from way(s) 410 to an available entry of way(s) 420—e.g., wherein the selected entry is a least recently used of all entries of way(s) 410.

Although some embodiments are not limited in this regard, such a demoted entry has its respective recency of use value changed based on the decision to move from way(s) 410 to way(s) 420. In one such embodiment, the demoted entry is given a recency of use metric (or other suitable ranking) which makes it the least likely to be evicted from way(s) 420. In another embodiment, such a recency of use metric makes the demoted entry the most likely to be evicted from way(s) 420. In still another embodiment, such a recency of use metric makes the demoted entry an Nth most likely to be evicted (where N is a positive integer such as three, for example).

In some embodiments, manager 180 (or another suitable resource of a processor core) provides additional functionality to dynamically change the amount of resources which are to be allocated for the provisioning of entries which are at a given prioritization level. For example, manager 180 and/or circuitry of cache sub-system 120, for example, is operable to reallocate a given one of way(s) 410 to instead operate as one of way(s) 420 (or alternatively, to reallocate a given one of way(s) 420 to instead operate as one of way(s) 410). Such reallocation is performed, for example, based on the number and/or frequency of stalls by a front end of a processor core exceeding a predetermined threshold maximum value.

Figure 5:
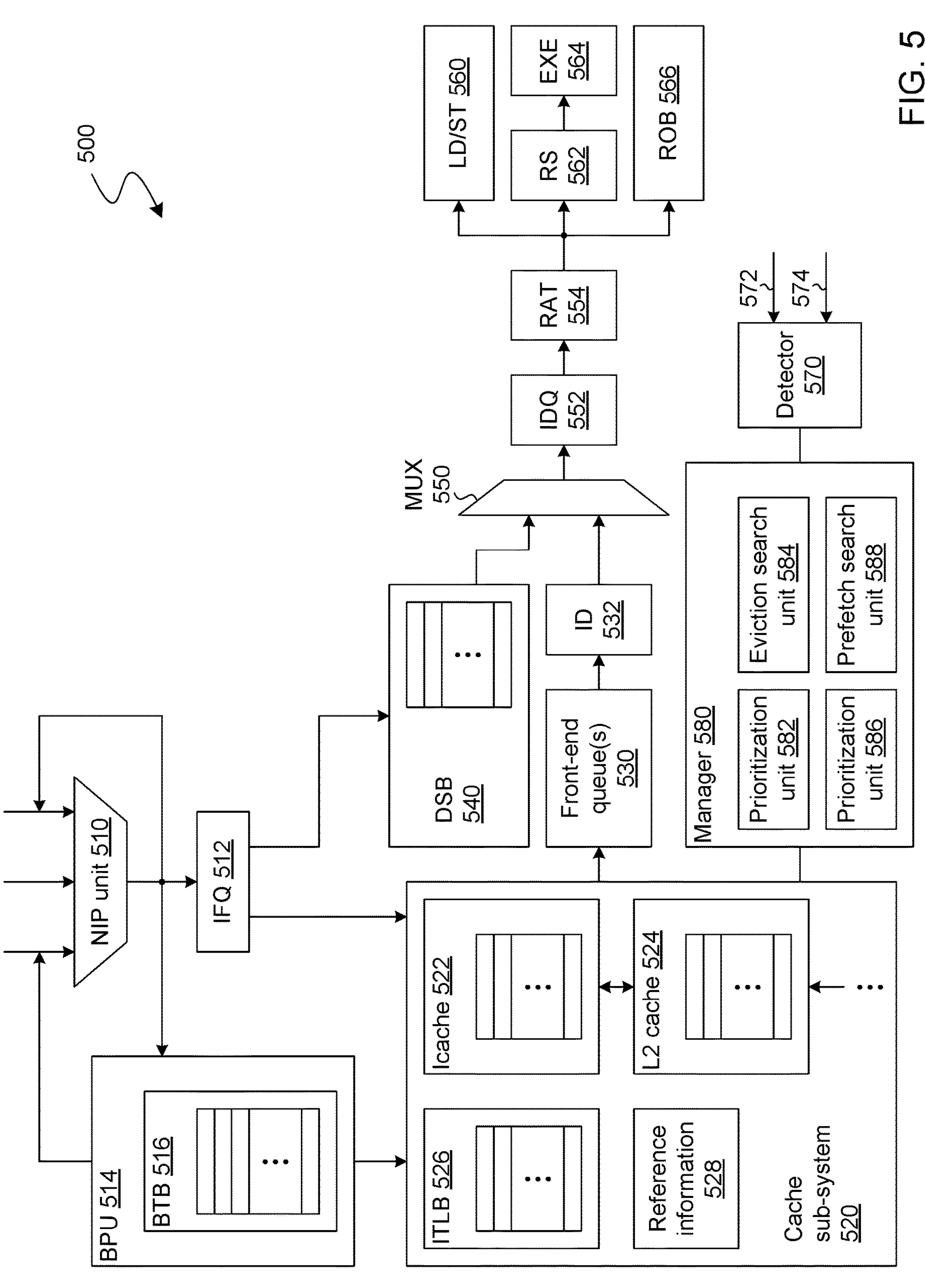
FIG. 5 shows a functional block diagram illustrating features of a processor core to fetch a version of an instruction for execution according to an embodiment.

FIG. 5 shows features of a processor core 500 to fetch a version of an instruction for execution according to an embodiment. The core 500 illustrates one example of an embodiment wherein PPR functionality is supplemented with additional functionality to selectively prioritize an instruction for prefetching. In various embodiments, core 500 provides functionality such as that of core 100—e.g., wherein one or more operations of method 200 are performed with core 500.

As shown in FIG. 5, a front end of core 500 comprises a next instruction pointer (NIP) unit 510, an instruction fetch queue (IFQ) 512, a branch prediction unit (BPU) 514, and a cache sub-system 520, which correspond functionally to NIP unit 110, IFQ 112, BPU 114, and cache sub-system 120 (respectively). The front end of core 500 further comprises one or more front end queues 530, an instruction decoder (ID) 532, a decoded stream buffer (DSB) 540, and a multiplexer 550, which correspond functionally to front end queue(s) 130, ID 132, DSB 140, and multiplexer 150 (respectively).

In one such embodiment, BPU 514 comprises (or alternatively, is coupled to) a branch target buffer (BTB) 516 which provides functionality such as that of BTB 116—e.g., wherein cache sub-system 520 comprises an instruction cache (Icache) 522, a second level (L2) cache 524, and an instruction translation lookaside buffer (ITLB) 526 which, for example, correspond functionally to instruction cache 122, L2 cache 124, and ITLB 126 (respectively).

Furthermore, a back end of core 500 comprises an instruction decode queue (IDQ) 552, a register alias table (RAT) 554, a load/store unit 560, a reservation station 562, an execution unit 564, and a reorder buffer 566, which correspond functionally to IDQ 152, RAT 154, load/store unit 160, reservation station 162, execution unit 164, and reorder buffer 166 (respectively).

Core 500 provides PPR functionality which variously prioritizes entries of an instruction fetch resource for enabling (or disabling) entry eviction. For example, core 500 comprises a detector 570 and a manager 580 which, for example, provide functionality such as that of detector 170 and manager 180 (respectively). Detector 570 is coupled to identify a first instruction, to manager 580, as being a basis for a first stall-retirement event—e.g., wherein such identification is based on indications 572, 574 which, for example, correspond functionally to indications 172, 174 (respectively).

In one such embodiment, a prioritization unit 582 of manager 580 selectively prioritizes entries of a first instruction fetch resource according to a first prioritization scheme which includes a first priority level and a second priority level. The first priority level is to exclude a given entry from being a candidate for selection for eviction from the first instruction fetch resource, whereas the second priority level is instead to include a given entry as a candidate to be selected for such eviction. By way of illustration and not limitation, prioritization unit 582 (which provides functionality of prioritization unit 182, for example) variously prioritizes entries of Icache 522, or of any of various other suitable instruction fetch resources. For example, in other embodiments, prioritization unit 582 additionally or alternatively prioritizes entries of one of ITLB 526, BTB 516, DSB 540, or the like.

In an embodiment, an eviction search unit 584 of manager 580 (or, for example, suitable circuit logic of cache sub-system 520) is adapted to search the first instruction fetch resource to select a victim entry which to be evicted therefrom. Such selection is performed based on the prioritization scheme which is provided with prioritization unit 582 based on stall-retirement events. For example, a search to identify a victim entry is performed while a first one or more entries of the first instruction fetch resource are each assigned the first (high) priority level, and while a second one or more entries of the first instruction fetch resource are each assigned the second (low) priority level. In one such embodiment, the victim entry is selected from among only the second one or more entries—e.g., wherein the first one or more entries are excluded from the search (or are otherwise prevented from being selected by the search) by virtue of their being currently promoted to the first priority level. By way of illustration and not limitation, the victim entry is selected from among only the second one or more entries based on some other criteria—e.g., including as recency of use criteria, an additional prioritization scheme, and/or the like—according to which some or all of the second one or more entries are to be distinguished from each other.

In some embodiments, manager 580 (or other suitable circuitry of core 500) further provides additional functionality which variously prioritizes entries of a second instruction fetch resource for enabling (or disabling) the prefetching of an instruction from said second instruction fetch resource. For example, detector 570 is further coupled to identify another instruction, to manager 580, as being a basis for another stall-retirement event—e.g., wherein such identification is based on indications 572, 574 or other suitable signal communication.

In some embodiments, another prioritization unit 586 (or, for example, prioritization unit 582) selectively prioritizes entries of a second instruction fetch resource according to a second prioritization scheme which includes a third priority level and a fourth priority level. In one such embodiment, the second instruction fetch resource is to be distinguished from the first instruction fetch resource for which prioritization unit 582 facilitates PPR functionality. The second instruction fetch resource is, for example, a cache from which a cached version of an instruction can be prefetched—e.g., wherein the second instruction fetch resource is L2 cache 524.

The third (relatively high) priority level is to include a given entry as a candidate for selection to be a source for instruction prefetching, whereas the fourth (relatively low) priority level is instead to exclude a given entry from being a candidate to be selected as an instruction prefetching source. By way of illustration and not limitation, prioritization unit 586 variously prioritizes entries of L2 cache 524, or of any of various other suitable instruction fetch resources.

In an embodiment, a prefetch search unit 588 of manager 580 (or, for example, suitable circuit logic of cache subsystem 520) is adapted to search the second instruction fetch resource to select a target entry from which an instruction is to be prefetched. Such selection is performed based on the second prioritization scheme which is provided with prioritization unit 586 based on stall-retirement events. For example, a search to identify a target entry is performed while a third one or more entries of the second instruction fetch resource are each assigned the third (relatively high) priority level, and while a fourth one or more entries of the second instruction fetch resource are each assigned the fourth (relatively low) priority level. In one such embodiment, the target entry is selected from among only the third one or more entries—e.g., wherein the fourth one or more entries are excluded from the search (or are otherwise prevented from being selected by the search) by virtue of their being currently demoted to the fourth priority level.

In an illustrative scenario according to one embodiment, prefetch search unit 588 is coupled to access (or alternatively, includes) reference information 528 which specifies or otherwise indicates a correspondence of trigger instructions (e.g., comprising branch instructions) each with a respective target instruction which is to be prefetched based on said trigger instruction. In some embodiments, prefetch search unit 588 is generated based on predictions by BPU 514—e.g., where such predictions are adapted from any of various known branch prediction techniques. In response to NIP unit 510 providing an indication of a given trigger instruction, prefetch search unit 588 accesses reference information 528 to determine whether a corresponding target instruction is to be prefetched. In one such embodiment, the determining by prefetch search unit 588 is based at least in part on whether the trigger instruction in question corresponds to any target instruction which is currently assigned the third (relatively high) priority level.

FIG. 6 shows features of a method 600 to prioritize an entry of a cache according to an embodiment. Method 600 illustrates one example of an embodiment which, based on a stall-retire event, assigns a relatively high prioritization to an entry which is to be included as a candidate to be targeted by an instruction prefetch search—e.g., wherein relatively low priority entries are instead to be excluded from said instruction prefetch search. Operations such as those of method 600 are performed, for example, with circuitry of one of cores 100, 500—e.g., wherein method 200 includes (or is performed in combination with) some or all of method 600.

To illustrate certain features of various embodiments, method 600 is described herein as supplementing—e.g., including, or being performed in addition to—a provisioning of a PPR functionality whereby a first entry of a first instruction fetch resource (such as a first cache) is assigned a relatively high priority based on a first retirement event wherein a first instruction is retired after a first stall based on the first instruction).

As shown in FIG. 6, method 600 comprises (at 610) searching, based on a miss of a first cache, a second cache which comprises second multiple entries which each correspond to a different respective instruction. For example, a second entry of the second multiple entries corresponds to (e.g., includes) a cached version of a second instruction. In an embodiment, the second cache is a lower level cache than the first cache. The second cache is available to provide cached instructions (and, in some embodiments, to further provide cached data). For example, the first cache and the second cache are Icache 122 and L2 cache 124, in one illustrative embodiment.

Method 600 further comprises (at 612) performing an assignment of a third priority level to the second entry based on a second retirement event (also referred to herein as a "stall-retirement event"). The second retirement event comprises the second instruction being retired after a second stall of the processor, wherein the second stall is based on the second instruction. In an embodiment, a second prioritization scheme comprises the third priority level and a fourth priority level which (as compared to the third priority level) is a relatively low priority.

In some embodiments, the assignment is performed at 612 by accessing a prioritization field of the second entry (e.g., wherein the second cache includes features of cache 300, or entry 350). In other embodiments, the assignment is performed at 612 by moving the second entry to, or creating the second entry in, a partition of the second cache which corresponds to the third priority level (wherein another partition of the second cache which corresponds to the fourth priority level). In contrast with the first prioritization scheme (which is to selectively enable or disable eviction from a first instruction fetch resource), the second prioritization is to selectively enable or disable the selection of an entry which is to provide an instruction for prefetching from the second cache.

For example, method 600 further comprises (at 614) performing a search to determine whether a "target" instruction—i.e., an instruction which is targeted by the search—is to be prefetched from the second cache. The search is performed at 614 based on the second prioritization scheme, wherein any entry selected by the search is one which is currently assigned the third priority level. For example, in an illustrative scenario according to one embodiment, the search is performed at 614 while a third one or more entries of the second multiple entries are each assigned the third priority level, and while a fourth one or more entries of the second multiple entries are each assigned the fourth priority level. In one such embodiment, the search performed at 614 is limited to only the third one or more entries—e.g., wherein the third priority level enables each of the third one or more entries to be a candidate for selection by the search, and wherein the fourth priority level prevents each of the fourth one or more entries from being such a candidate.

In various embodiments, performing the assignment at 612 comprises generating reference information (e.g., in a table, list or other suitable data structure) which identifies a correspondence of the target instruction with a respective "trigger" instruction which precedes the target instruction in a sequence of instructions. In this particular context, a "trigger instruction" refers to a branch instruction (or other suitable instruction), the execution of which is predicted to result in the execution of a corresponding "target" instruction.

The reference information (e.g., an item of reference information 528) is generated, for example, based on a version of the second instruction being created in a cache, moved between caches or the like. Additionally or alternatively, the reference information is generated based on branch prediction circuitry (e.g., BPU 514) predicting that the second instruction is to be subsequently executed after—and based on a result of—the corresponding trigger instruction being executed.

In various embodiments, performing the search at 614 is based on (or, for example, comprises) accessing the reference information to identify the correspondence of the target instruction with the trigger instruction. In one such embodiment, the reference information is accessed—by BPU 514, manager 580 or other suitable circuit logic-based on an indication (from NIP unit 110, or NIP unit 510, for example) that the trigger instruction is to be executed.

FIG. 7 shows features of a table 700 to provide reference information which facilitates the prefetching of an instruction from among prioritized cache entries according to an embodiment. The table 700 illustrates one example of an embodiment wherein the correspondence of various trigger instructions, each with a respective target instruction, is defined or otherwise provided to determine whether a search of prioritized cache entries is to be performed. In various embodiments, table 700 provides functionality such as that of reference information 528—e.g., wherein one or more operations of method 600 (and/or method 200, for example) are performed with table 700.

As shown in FIG. 7, table 700 comprises entries 710*a* . . . 710*y* which are each to identify a correspondence of a respective trigger instruction and a respective target instruction. Some embodiments search table 700, based on an instruction pointer or other suitable identifier of a trigger instruction, to identify whether the trigger instruction in question corresponds to another instruction which is currently cached, and which is currently prioritized for prefetching. By way of illustration and not limitation, table 700 comprises a trigger instruction field 712 to identify a particular branch (or other) instruction, and a target instruction field 714 to identify a particular instruction as being a target instruction which corresponds to the trigger instruction in question.

In some embodiments, a trigger instruction identified in table 700 is a most recent preceding branch instruction, before the corresponding target instruction, in a (predicted) sequence of instructions being executed. Additionally or alternatively, a trigger instruction identified in table 700 is an instruction which was previously the subject of a failed branch prediction.

In an illustrative scenario according to one embodiment, entry 710*a* identifies a correspondence of a branch instruction BR1 to a respective target instruction INSTRa—e.g., wherein entry 710*b* identifies a correspondence of a branch instruction BR2 to a respective target instruction INSTRb. Additionally or alternatively, entry 710*c* identifies a correspondence of a branch instruction BR3 to a respective target instruction INSTRc—e.g., wherein entry 710*y* identifies a correspondence of a branch instruction BRy to a respective target instruction INSTRy.

The particular order, and the respective sizes of fields 712, 714 is merely illustrative, and not limiting on some embodiments. In various embodiments, table 700 further comprises any of various other fields (not shown) to facilitate the communication and/or use of information which determines whether and/or how prioritized entries of a cache are to be searched for an instruction which is to be prefetched.

Figure 8:
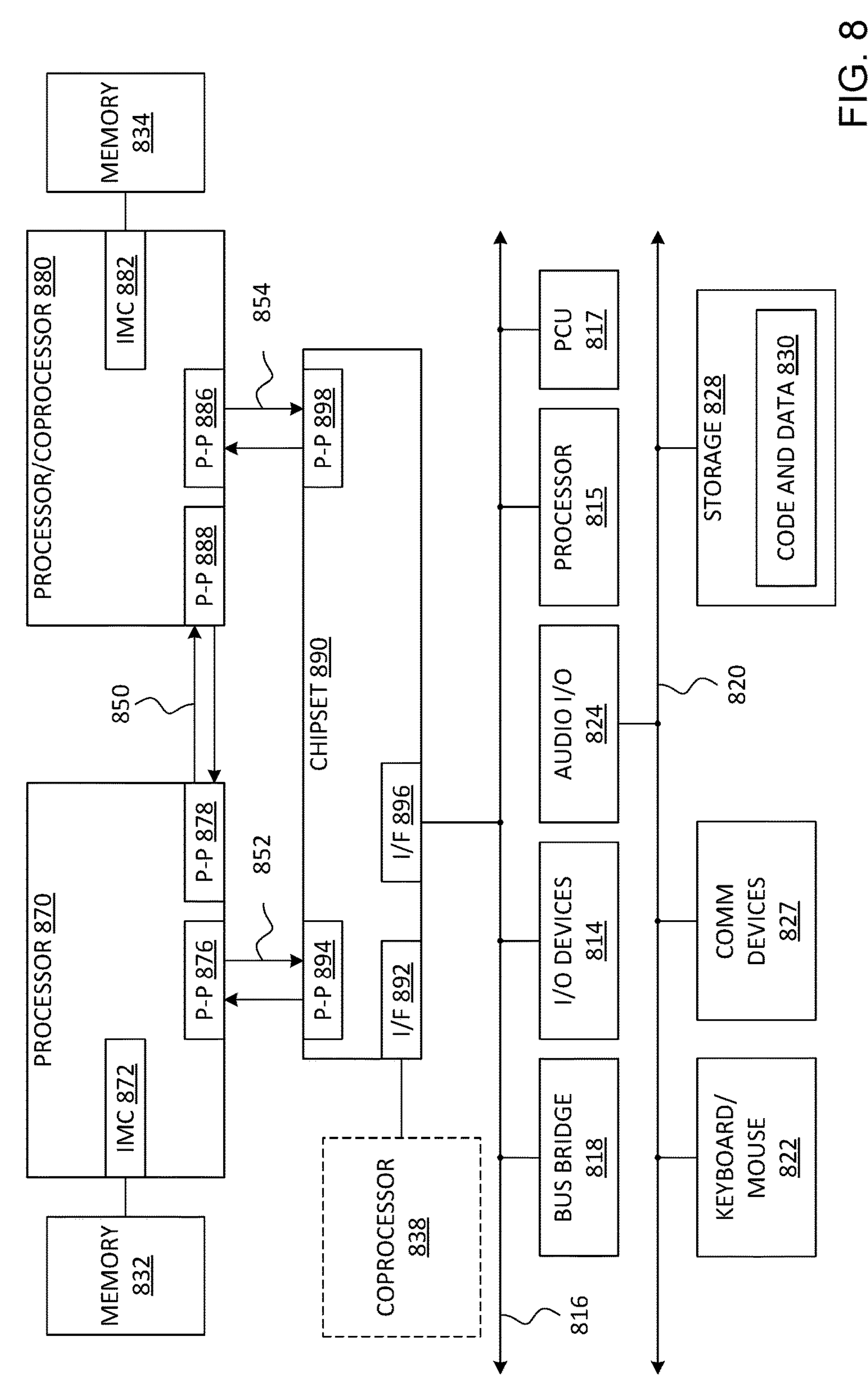
FIG. 8 illustrates an exemplary system.

FIG. 8 illustrates an exemplary system. Multiprocessor system 800 is a point-to-point interconnect system and includes a plurality of processors including a first processor 870 and a second processor 880 coupled via a point-to-point interconnect 850. In some examples, the first processor 870 and the second processor 880 are homogeneous. In some examples, first processor 870 and the second processor 880 are heterogenous. Though the exemplary system 800 is shown to have two processors, the system may have three or more processors, or may be a single processor system.

Processors 870 and 880 are shown including integrated memory controller (IMC) circuitry 872 and 882, respectively. Processor 870 also includes as part of its interconnect controller point-to-point (P-P) interfaces 876 and 878; similarly, second processor 880 includes P-P interfaces 886 and 888. Processors 870, 880 may exchange information via the point-to-point (P-P) interconnect 850 using P-P interface circuits 878, 888. IMCs 872 and 882 couple the processors 870, 880 to respective memories, namely a memory 832 and a memory 834, which may be portions of main memory locally attached to the respective processors.

Processors 870, 880 may each exchange information with a chipset 890 via individual P-P interconnects 852, 854 using point to point interface circuits 876, 894, 886, 898. Chipset 890 may optionally exchange information with a coprocessor 838 via an interface 892. In some examples, the coprocessor 838 is a special-purpose processor, such as, for example, a high-throughput processor, a network or communication processor, compression engine, graphics processor, general purpose graphics processing unit (GPGPU), neural-network processing unit (NPU), embedded processor, or the like.

A shared cache (not shown) may be included in either processor 870, 880 or outside of both processors, yet connected with the processors via P-P interconnect, such that either or both processors' local cache information may be stored in the shared cache if a processor is placed into a low power mode.

Chipset 890 may be coupled to a first interconnect 816 via an interface 896. In some examples, first interconnect 816 may be a Peripheral Component Interconnect (PCI) interconnect, or an interconnect such as a PCI Express interconnect or another I/O interconnect. In some examples, one of the interconnects couples to a power control unit (PCU) 817, which may include circuitry, software, and/or firmware to perform power management operations with regard to the processors 870, 880 and/or co-processor 838. PCU 817 provides control information to a voltage regulator (not shown) to cause the voltage regulator to generate the appropriate regulated voltage. PCU 817 also provides control information to control the operating voltage generated. In various examples, PCU 817 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 817 is illustrated as being present as logic separate from the processor 870 and/or processor 880. In other cases, PCU 817 may execute on a given one or more of cores (not shown) of processor 870 or 880. In some cases, PCU 817 may be implemented as a microcontroller (dedicated or general-purpose) or other control logic configured to execute its own dedicated power management code, sometimes referred to as P-code. In yet other examples, power management operations to be performed by PCU 817 may be implemented externally to a processor, such as by way of a separate power management integrated circuit (PMIC) or another component external to the processor. In yet other examples, power management operations to be performed by PCU 817 may be implemented within BIOS or other system software.

Various I/O devices 814 may be coupled to first interconnect 816, along with a bus bridge 818 which couples first interconnect 816 to a second interconnect 820. In some examples, one or more additional processor(s) 815, such as coprocessors, high-throughput many integrated core (MIC) processors, GPGPUs, accelerators (such as graphics accelerators or digital signal processing (DSP) units), field programmable gate arrays (FPGAs), or any other processor, are coupled to first interconnect 816. In some examples, second interconnect 820 may be a low pin count (LPC) interconnect. Various devices may be coupled to second interconnect 820 including, for example, a keyboard and/or mouse 822, communication devices 827 and a storage circuitry 828. Storage circuitry 828 may be one or more non-transitory machine-readable storage media as described below, such as a disk drive or other mass storage device which may include instructions/code and data 830 in some examples. Further, an audio I/O 824 may be coupled to second interconnect 820. Note that other architectures than the point-to-point architecture described above are possible. For example, instead of the point-to-point architecture, a system such as multiprocessor system 800 may implement a multi-drop interconnect or other such architecture.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may include on the same die as the described CPU (sometimes referred to as the application core(s) or application processor(s)), the above described coprocessor, and additional functionality. Exemplary core architectures are described next, followed by descriptions of exemplary processors and computer architectures.

FIG. 9 illustrates a block diagram of an example processor 900 that may have more than one core and an integrated memory controller. The solid lined boxes illustrate a processor 900 with a single core 902A, a system agent unit circuitry 910, a set of one or more interconnect controller unit(s) circuitry 916, while the optional addition of the dashed lined boxes illustrates an alternative processor 900 with multiple cores 902A-N, a set of one or more integrated memory controller unit(s) circuitry 914 in the system agent unit circuitry 910, and special purpose logic 908, as well as a set of one or more interconnect controller units circuitry 916. Note that the processor 900 may be one of the processors 870 or 880, or co-processor 838 or 815 of FIG. 8.

Thus, different implementations of the processor 900 may include: 1) a CPU with the special purpose logic 908 being integrated graphics and/or scientific (throughput) logic (which may include one or more cores, not shown), and the cores 902A-N being one or more general purpose cores (e.g., general purpose in-order cores, general purpose out-of-order cores, or a combination of the two); 2) a coprocessor with the cores 902A-N being a large number of special purpose cores intended primarily for graphics and/or scientific (throughput) computing; and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 904A-N within the cores 902A-N, a set of one or more shared cache unit(s) circuitry 906, and external memory (not shown) coupled to the set of integrated memory controller unit(s) circuitry 914. The set of one or more shared cache unit(s) circuitry 906 may include one or more mid-level caches, such as level 2 (L2), level 3 (L3), level 4 (L4), or other levels of cache, such as a last level cache (LLC), and/or combinations thereof. While in some examples ring-based interconnect network circuitry 912 interconnects the special purpose logic 908 (e.g., integrated graphics logic), the set of shared cache unit(s) circuitry 906, and the system agent unit circuitry 910, alternative examples use any number of well-known techniques for interconnecting such units. In some examples, coherency is maintained between one or more of the shared cache unit(s) circuitry 906 and cores 902A-N.

In some examples, one or more of the cores 902A-N are capable of multi-threading. The system agent unit circuitry 910 includes those components coordinating and operating cores 902A-N. The system agent unit circuitry 910 may include, for example, power control unit (PCU) circuitry and/or display unit circuitry (not shown). The PCU may be or may include logic and components needed for regulating the power state of the cores 902A-N and/or the special purpose logic 908 (e.g., integrated graphics logic). The display unit circuitry is for driving one or more externally connected displays.

The cores 902A-N may be homogenous in terms of instruction set architecture (ISA). Alternatively, the cores 902A-N may be heterogeneous in terms of ISA; that is, a subset of the cores 902A-N may be capable of executing an ISA, while other cores may be capable of executing only a subset of that ISA or another ISA.

Exemplary Core Architectures-In-Order and Out-of-Order Core Block Diagram

Figures 10A, 10B:
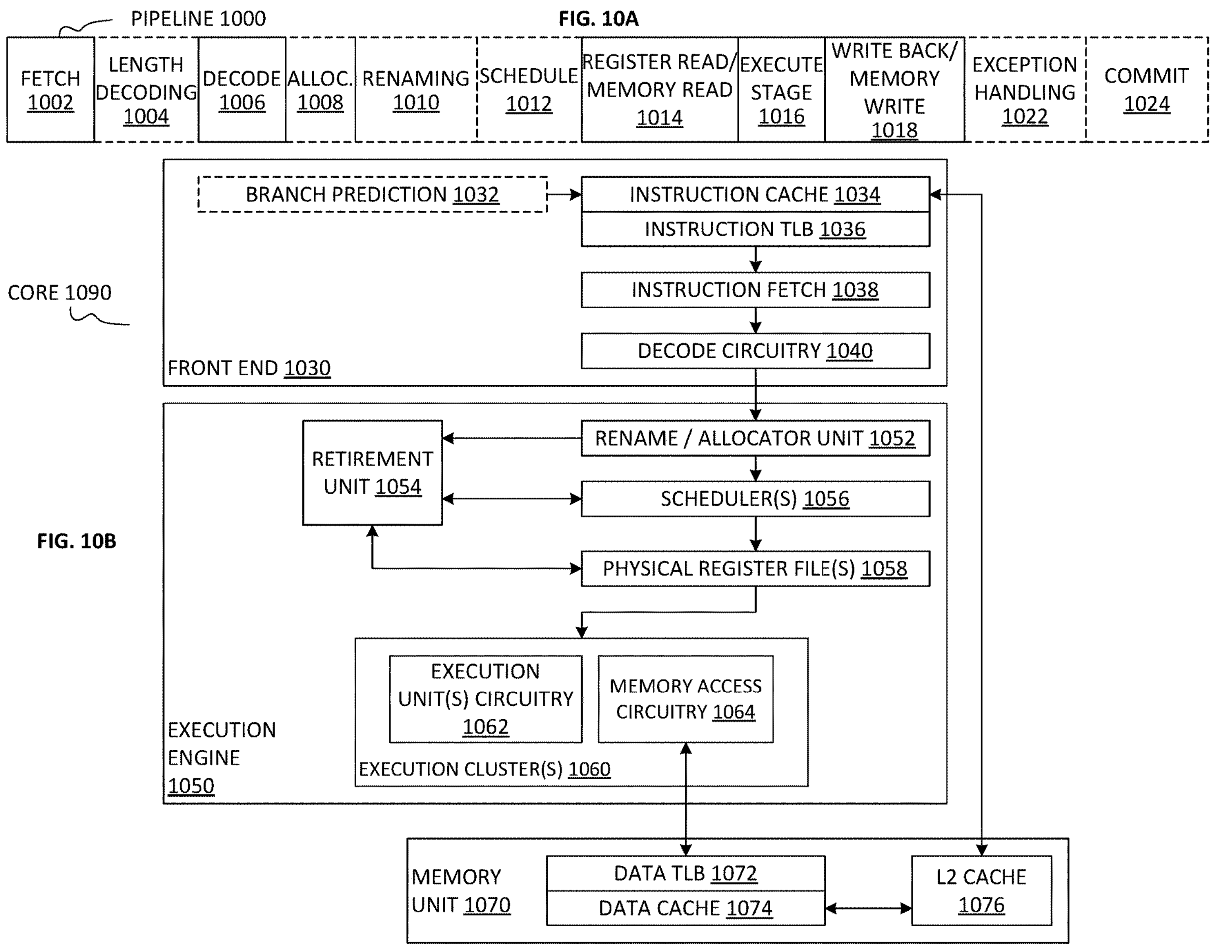
FIG. 10A is a block diagram illustrating both an exemplary in-order pipeline and an exemplary register renaming, out-of-order issue/execution pipeline according to examples.
FIG. 10B is a block diagram illustrating both an exemplary example of an in-order architecture core and an exemplary register renaming, out-of-order issue/execution architecture core to be included in a processor according to examples.

FIG. 10A is a block diagram illustrating both an exemplary in-order pipeline and an exemplary register renaming, out-of-order issue/execution pipeline according to examples. FIG. 10B is a block diagram illustrating both an exemplary example of an in-order architecture core and an exemplary register renaming, out-of-order issue/execution architecture core to be included in a processor according to examples. The solid lined boxes in FIGS. 10A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, an optional length decoding stage 1004, a decode stage 1006, an optional allocation (Alloc) stage 1008, an optional renaming stage 1010, a schedule (also known as a dispatch or issue) stage 1012, an optional register read/memory read stage 1014, an execute stage 1016, a write back/memory write stage 1018, an optional exception handling stage 1022, and an optional commit stage 1024. One or more operations can be performed in each of these processor pipeline stages. For example, during the fetch stage 1002, one or more instructions are fetched from instruction memory, and during the decode stage 1006, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 1006 and the register read/memory read stage 1014 may be combined into one pipeline stage. In one example, during the execute stage 1016, the decoded instructions may be executed, LSU address/data pipelining to an Advanced Microcontroller Bus (AMB) interface may be performed, multiply and add operations may be performed, arithmetic operations with branch results may be performed, etc.

By way of example, the exemplary register renaming, out-of-order issue/execution architecture core of FIG. 10B may implement the pipeline 1000 as follows: 1) the instruction fetch circuitry 1038 performs the fetch and length decoding stages 1002 and 1004; 2) the decode circuitry 1040 performs the decode stage 1006; 3) the rename/allocator unit circuitry 1052 performs the allocation stage 1008 and renaming stage 1010; 4) the scheduler(s) circuitry 1056 performs the schedule stage 1012; 5) the physical register file(s) circuitry 1058 and the memory unit circuitry 1070 perform the register read/memory read stage 1014; the execution cluster(s) 1060 perform the execute stage 1016; 6) the memory unit circuitry 1070 and the physical register file(s) circuitry 1058 perform the write back/memory write stage 1018; 7) various circuitry may be involved in the exception handling stage 1022; and 8) the retirement unit circuitry 1054 and the physical register file(s) circuitry 1058 perform the commit stage 1024.

FIG. 10B shows a processor core 1090 including front-end unit circuitry 1030 coupled to an execution engine unit circuitry 1050, and both are coupled to a memory unit circuitry 1070. The core 1090 may be a reduced instruction set architecture computing (RISC) core, a complex instruction set architecture computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front end unit circuitry 1030 may include branch prediction circuitry 1032 coupled to an instruction cache circuitry 1034, which is coupled to an instruction translation lookaside buffer (TLB) 1036, which is coupled to instruction fetch circuitry 1038, which is coupled to decode circuitry 1040. In one example, the instruction cache circuitry 1034 is included in the memory unit circuitry 1070 rather than the front-end circuitry 1030. The decode circuitry 1040 (or decoder) may decode instructions, and generate as an output one or more micro-operations, micro-code entry points, microinstructions, other instructions, or other control signals, which are decoded from, or which otherwise reflect, or are derived from, the original instructions. The decode circuitry 1040 may further include an address generation unit (AGU, not shown) circuitry. In one example, the AGU generates an LSU address using forwarded register ports, and may further perform branch forwarding (e.g., immediate offset branch forwarding, LR register branch forwarding, etc.). The decode circuitry 1040 may be implemented using various different mechanisms. Examples of suitable mechanisms include, but are not limited to, look-up tables, hardware implementations, programmable logic arrays (PLAs), microcode read only memories (ROMs), etc. In one example, the core 1090 includes a microcode ROM (not shown) or other medium that stores microcode for certain macroinstructions (e.g., in decode circuitry 1040 or otherwise within the front end circuitry 1030). In one example, the decode circuitry 1040 includes a micro-operation (micro-op) or operation cache (not shown) to hold/cache decoded operations, micro-tags, or micro-operations generated during the decode or other stages of the processor pipeline 1000. The decode circuitry 1040 may be coupled to rename/allocator unit circuitry 1052 in the execution engine circuitry 1050.

The execution engine circuitry 1050 includes the rename/allocator unit circuitry 1052 coupled to a retirement unit circuitry 1054 and a set of one or more scheduler(s) circuitry 1056. The scheduler(s) circuitry 1056 represents any number of different schedulers, including reservations stations, central instruction window, etc. In some examples, the scheduler(s) circuitry 1056 can include arithmetic logic unit (ALU) scheduler/scheduling circuitry, ALU queues, arithmetic generation unit (AGU) scheduler/scheduling circuitry, AGU queues, etc. The scheduler(s) circuitry 1056 is coupled to the physical register file(s) circuitry 1058. Each of the physical register file(s) circuitry 1058 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 1058 includes vector registers unit circuitry, writemask registers unit circuitry, and scalar register unit circuitry. These register units may provide architectural vector registers, vector mask registers, general-purpose registers, etc. The physical register file(s) circuitry 1058 is coupled to the retirement unit circuitry 1054 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using one or more register maps and a pool of registers; etc.). The retirement unit circuitry 1054 and the physical register file(s) circuitry 1058 are coupled to the execution cluster(s) 1060. The execution cluster(s) 1060 includes a set of one or more execution unit(s) circuitry 1062 and a set of one or more memory access circuitry 1064. The execution unit(s) circuitry 1062 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 1056, physical register file(s) circuitry 1058, and execution cluster(s) 1060 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 1064). It should also be understood that where separate pipelines are used, one or more of these pipelines may be out-of-order issue/execution and the rest in-order.

In some examples, the execution engine unit circuitry 1050 may perform load store unit (LSU) address/data pipelining to an Advanced Microcontroller Bus (AMB) interface (not shown), and address phase and writeback, data phase load, store, and branches.

The set of memory access circuitry 1064 is coupled to the memory unit circuitry 1070, which includes data TLB circuitry 1072 coupled to a data cache circuitry 1074 coupled to a level 2 (L2) cache circuitry 1076. In one exemplary example, the memory access circuitry 1064 may include a load unit circuitry, a store address unit circuit, and a store data unit circuitry, each of which is coupled to the data TLB circuitry 1072 in the memory unit circuitry 1070. The instruction cache circuitry 1034 is further coupled to the level 2 (L2) cache circuitry 1076 in the memory unit circuitry 1070. In one example, the instruction cache 1034 and the data cache 1074 are combined into a single instruction and data cache (not shown) in L2 cache circuitry 1076, a level 3 (L3) cache circuitry (not shown), and/or main memory. The L2 cache circuitry 1076 is coupled to one or more other levels of cache and eventually to a main memory.

The core 1090 may support one or more instructions sets (e.g., the x86 instruction set architecture (optionally with some extensions that have been added with newer versions); the MIPS instruction set architecture; the ARM instruction set architecture (optionally with optional additional extensions such as NEON)), including the instruction(s) described herein. In one example, the core 1090 includes logic to support a packed data instruction set architecture extension (e.g., AVX1, AVX2), thereby allowing the operations used by many multimedia applications to be performed using packed data.

Exemplary Execution Unit(s) Circuitry

Figure 11:
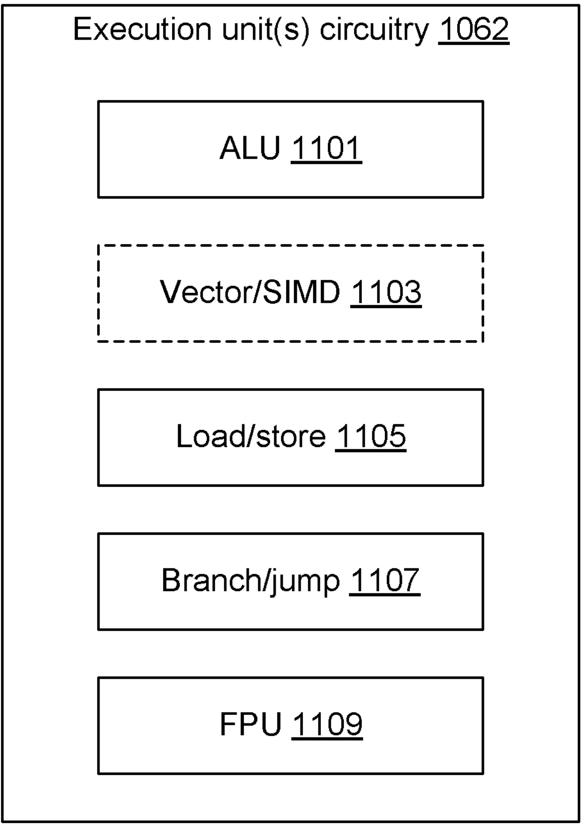
FIG. 11 illustrates examples of execution unit(s) circuitry.

FIG. 11 illustrates examples of execution unit(s) circuitry, such as execution unit(s) circuitry 1062 of FIG. 10B. As illustrated, execution unit(s) circuitry 1062 may include one or more ALU circuits 1101, optional vector/single instruction multiple data (SIMD) circuits 1103, load/store circuits 1105, branch/jump circuits 1107, and/or Floating-point unit (FPU) circuits 1109. ALU circuits 1101 perform integer arithmetic and/or Boolean operations. Vector/SIMD circuits 1103 perform vector/SIMD operations on packed data (such as SIMD/vector registers). Load/store circuits 1105 execute load and store instructions to load data from memory into registers or store from registers to memory. Load/store circuits 1105 may also generate addresses. Branch/jump circuits 1107 cause a branch or jump to a memory address depending on the instruction. FPU circuits 1109 perform floating-point arithmetic. The width of the execution unit(s) circuitry 1062 varies depending upon the example and can range from 16-bit to 1,024-bit, for example. In some examples, two or more smaller execution units are logically combined to form a larger execution unit (e.g., two 128-bit execution units are logically combined to form a 256-bit execution unit).

Exemplary Register Architecture

Figures 12, 13:
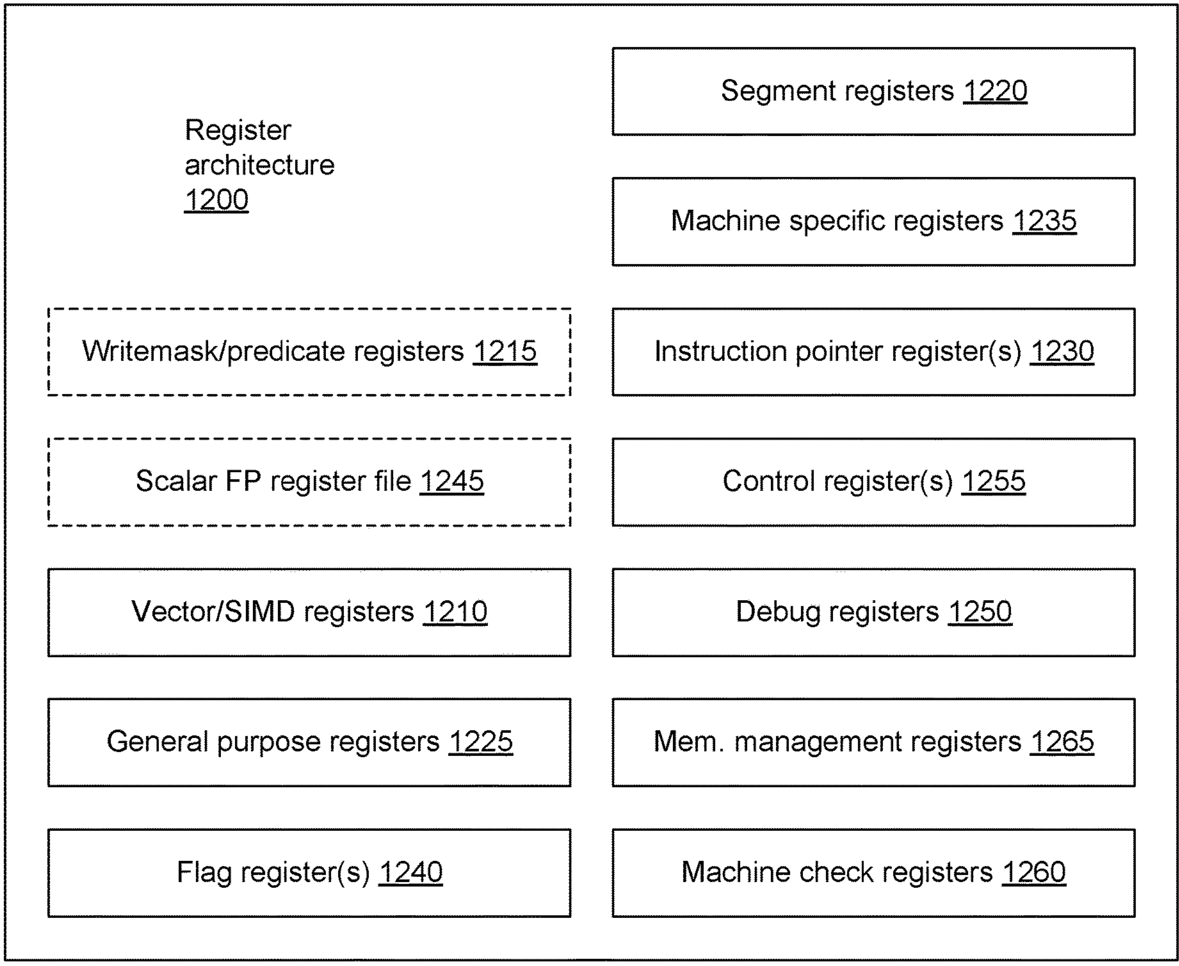
FIG. 12 is a block diagram of a register architecture according to some examples.
FIG. 13 illustrates examples of an instruction format.

FIG. 12 is a block diagram of a register architecture 1200 according to some examples. As illustrated, the register architecture 1200 includes vector/SIMD registers 1210 that vary from 128-bit to 1,024 bits width. In some examples, the vector/SIMD registers 1210 are physically 512-bits and, depending upon the mapping, only some of the lower bits are used. For example, in some examples, the vector/SIMD registers 1210 are ZMM registers which are 512 bits: the lower 256 bits are used for YMM registers and the lower 128 bits are used for XMM registers. As such, there is an overlay of registers. In some examples, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the example.

In some examples, the register architecture 1200 includes writemask/predicate registers 1215. For example, in some examples, there are 8 writemask/predicate registers (sometimes called k0 through k7) that are each 16-bit, 32-bit, 64-bit, or 128-bit in size. Writemask/predicate registers 1215 may allow for merging (e.g., allowing any set of elements in the destination to be protected from updates during the execution of any operation) and/or zeroing (e.g., zeroing vector masks allow any set of elements in the destination to be zeroed during the execution of any operation). In some examples, each data element position in a given writemask/predicate register 1215 corresponds to a data element position of the destination. In other examples, the writemask/predicate registers 1215 are scalable and consists of a set number of enable bits for a given vector element (e.g., 8 enable bits per 64-bit vector element).

The register architecture 1200 includes a plurality of general-purpose registers 1225. These registers may be 16-bit, 32-bit, 64-bit, etc. and can be used for scalar operations. In some examples, these registers are referenced by the names RAX, RBX, RCX, RDX, RBP, RSI, RDI, RSP, and R8 through R15.

In some examples, the register architecture 1200 includes scalar floating-point (FP) register 1245 which is used for scalar floating-point operations on 32/64/80-bit floating-point data using the x87 instruction set architecture extension or as MMX registers to perform operations on 64-bit packed integer data, as well as to hold operands for some operations performed between the MMX and XMM registers.

One or more flag registers 1240 (e.g., EFLAGS, RFLAGS, etc.) store status and control information for arithmetic, compare, and system operations. For example, the one or more flag registers 1240 may store condition code information such as carry, parity, auxiliary carry, zero, sign, and overflow. In some examples, the one or more flag registers 1240 are called program status and control registers.

Segment registers 1220 contain segment points for use in accessing memory. In some examples, these registers are referenced by the names CS, DS, SS, ES, FS, and GS.

Machine specific registers (MSRs) 1235 control and report on processor performance. Most MSRs 1235 handle system-related functions and are not accessible to an application program. Machine check registers 1260 consist of control, status, and error reporting MSRs that are used to detect and report on hardware errors.

One or more instruction pointer register(s) 1230 store an instruction pointer value. Control register(s) 1255 (e.g., CR0-CR4) determine the operating mode of a processor (e.g., processor 870, 880, 838, 815, and/or 900) and the characteristics of a currently executing task. Debug registers 1250 control and allow for the monitoring of a processor or core's debugging operations.

Memory (mem) management registers 1265 specify the locations of data structures used in protected mode memory management. These registers may include a GDTR, IDRT, task register, and a LDTR register.

Alternative examples may use wider or narrower registers. Additionally, alternative examples may use more, less, or different register files and registers. The register architecture 1200 may, for example, be used in physical register file(s) circuitry 1058.

Instruction Set Architectures

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down through the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. In addition, though the description below is made in the context of x86 ISA, it is within the knowledge of one skilled in the art to apply the teachings of the present disclosure in another ISA.

Exemplary Instruction Formats

Examples of the instruction(s) described herein may be embodied in different formats. Additionally, exemplary systems, architectures, and pipelines are detailed below. Examples of the instruction(s) may be executed on such systems, architectures, and pipelines, but are not limited to those detailed.

FIG. 13 illustrates examples of an instruction format. As illustrated, an instruction may include multiple components including, but not limited to, one or more fields for: one or more prefixes 1301, an opcode 1303, addressing information 1305 (e.g., register identifiers, memory addressing information, etc.), a displacement value 1307, and/or an immediate value 1309. Note that some instructions utilize some or all of the fields of the format whereas others may only use the field for the opcode 1303. In some examples, the order illustrated is the order in which these fields are to be encoded, however, it should be appreciated that in other examples these fields may be encoded in a different order, combined, etc.

The prefix(es) field(s) 1301, when used, modifies an instruction. In some examples, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 1303 is used to at least partially define the operation to be performed upon a decoding of the instruction. In some examples, a primary opcode encoded in the opcode field 1303 is one, two, or three bytes in length. In other examples, a primary opcode can be a different length. An additional 3-bit opcode field is sometimes encoded in another field.

Figure 14:
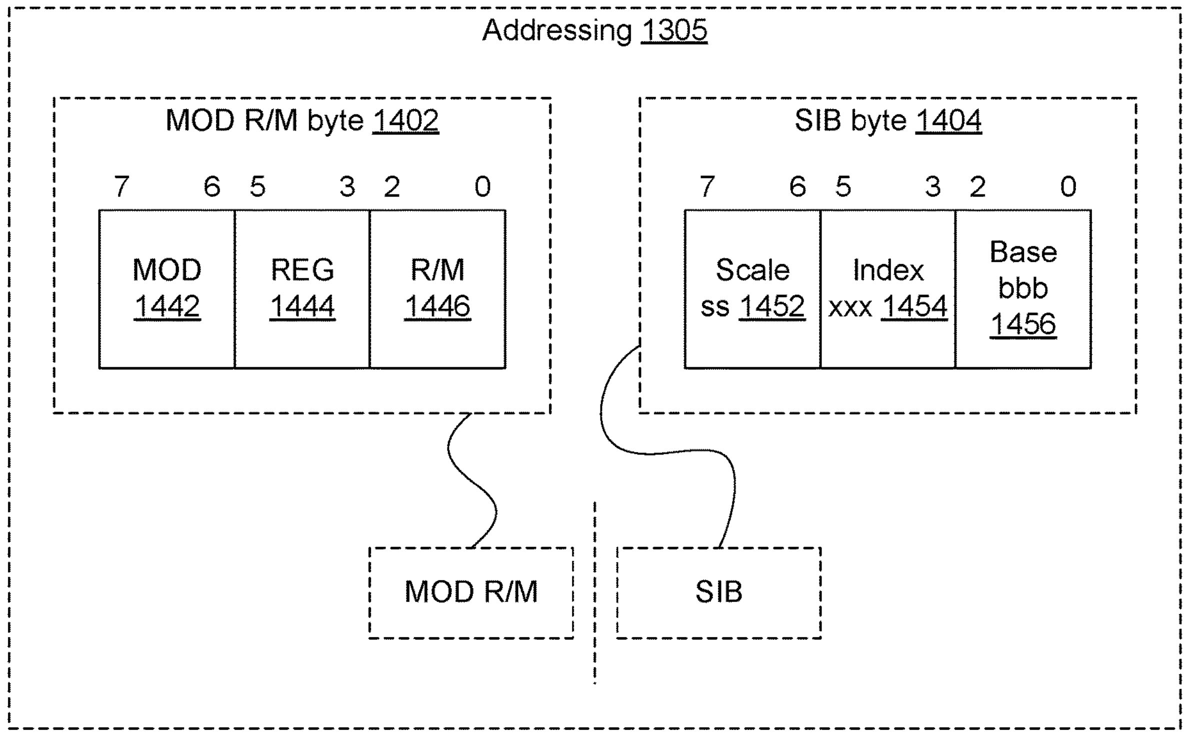
FIG. 14 illustrates examples of an addressing field.

The addressing field 1305 is used to address one or more operands of the instruction, such as a location in memory or one or more registers. FIG. 14 illustrates examples of the addressing field 1305. In this illustration, an optional ModR/M byte 1402 and an optional Scale, Index, Base (SIB) byte 1404 are shown. The ModR/M byte 1402 and the SIB byte 1404 are used to encode up to two operands of an instruction, each of which is a direct register or effective memory address. Note that each of these fields are optional in that not all instructions include one or more of these fields. The MOD R/M byte 1402 includes a MOD field 1442, a register (reg) field 1444, and R/M field 1446.

The content of the MOD field 1442 distinguishes between memory access and non-memory access modes. In some examples, when the MOD field 1442 has a binary value of 11 (11b), a register-direct addressing mode is utilized, and otherwise register-indirect addressing is used.

The register field 1444 may encode either the destination register operand or a source register operand, or may encode an opcode extension and not be used to encode any instruction operand. The content of register index field 1444, directly or through address generation, specifies the locations of a source or destination operand (either in a register or in memory). In some examples, the register field 1444 is supplemented with an additional bit from a prefix (e.g., prefix 1301) to allow for greater addressing.

The R/M field 1446 may be used to encode an instruction operand that references a memory address or may be used to encode either the destination register operand or a source register operand. Note the R/M field 1446 may be combined with the MOD field 1442 to dictate an addressing mode in some examples.

The SIB byte 1404 includes a scale field 1452, an index field 1454, and a base field 1456 to be used in the generation of an address. The scale field 1452 indicates scaling factor. The index field 1454 specifies an index register to use. In some examples, the index field 1454 is supplemented with an additional bit from a prefix (e.g., prefix 1301) to allow for greater addressing. The base field 1456 specifies a base register to use. In some examples, the base field 1456 is supplemented with an additional bit from a prefix (e.g., prefix 1301) to allow for greater addressing. In practice, the content of the scale field 1452 allows for the scaling of the content of the index field 1454 for memory address generation (e.g., for address generation that uses 2scale*index+base).

Some addressing forms utilize a displacement value to generate a memory address. For example, a memory address may be generated according to 2scale*index+base+displacement, index*scale+displacement, r/m+displacement, instruction pointer (RIP/EIP)+displacement, register+displacement, etc. The displacement may be a 1-byte, 2-byte, 4-byte, etc. value. In some examples, a displacement 1307 provides this value. Additionally, in some examples, a displacement factor usage is encoded in the MOD field of the addressing field 1305 that indicates a compressed displacement scheme for which a displacement value is calculated and stored in the displacement field 1307.

In some examples, an immediate field 1309 specifies an immediate value for the instruction. An immediate value may be encoded as a 1-byte value, a 2-byte value, a 4-byte value, etc.

FIG. 15 illustrates examples of a first prefix 1301(A). In some examples, the first prefix 1301(A) is an example of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 1301(A) may specify up to three registers using 3-bit fields depending on the format: 1) using the reg field 1444 and the R/M field 1446 of the Mod R/M byte 1402; 2) using the Mod R/M byte 1402 with the SIB byte 1404 including using the reg field 1444 and the base field 1456 and index field 1454; or 3) using the register field of an opcode.

In the first prefix 1301(A), bit positions 7:4 are set as 0100. Bit position 3 (W) can be used to determine the operand size but may not solely determine operand width. As such, when W=0, the operand size is determined by a code segment descriptor (CS.D) and when W=1, the operand size is 64-bit.

Note that the addition of another bit allows for 16 (24) registers to be addressed, whereas the MOD R/M reg field 1444 and MOD R/M R/M field 1446 alone can each only address 8 registers.

In the first prefix 1301(A), bit position 2 (R) may be an extension of the MOD R/M reg field 1444 and may be used to modify the ModR/M reg field 1444 when that field encodes a general-purpose register, a 64-bit packed data register (e.g., an SSE register), or a control or debug register. R is ignored when Mod R/M byte 1402 specifies other registers or defines an extended opcode.

Bit position 1 (X) may modify the SIB byte index field 1454.

Bit position 0 (B) may modify the base in the Mod R/M R/M field 1446 or the SIB byte base field 1456; or it may modify the opcode register field used for accessing general purpose registers (e.g., general purpose registers 1225).

FIGS. 16A-D illustrate examples of how the R, X, and B fields of the first prefix 1301(A) are used. FIG. 16A illustrates R and B from the first prefix 1301(A) being used to extend the reg field 1444 and R/M field 1446 of the MOD R/M byte 1402 when the SIB byte 1404 is not used for memory addressing. FIG. 16B illustrates R and B from the first prefix 1301(A) being used to extend the reg field 1444 and R/M field 1446 of the MOD R/M byte 1402 when the SIB byte 1404 is not used (register-register addressing). FIG. 16C illustrates R, X, and B from the first prefix 1301(A) being used to extend the reg field 1444 of the MOD R/M byte 1402 and the index field 1454 and base field 1456 when the SIB byte 1404 being used for memory addressing. FIG. 16D illustrates B from the first prefix 1301(A) being used to extend the reg field 1444 of the MOD R/M byte 1402 when a register is encoded in the opcode 1303.

Figure 17A:
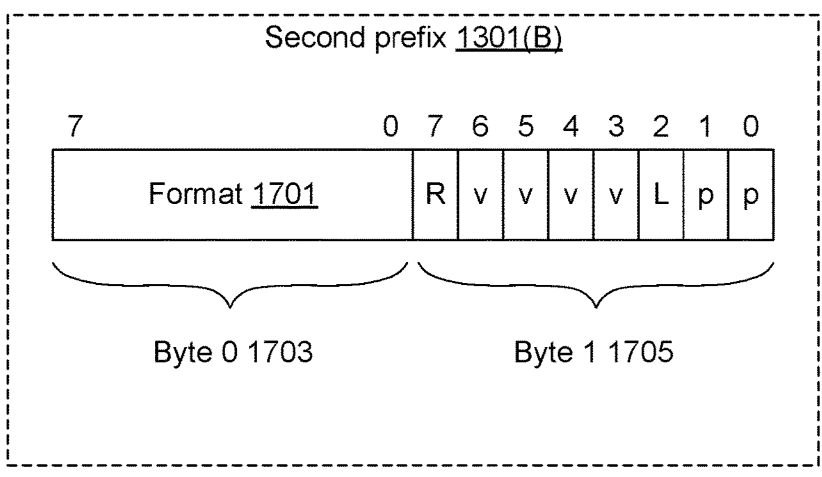
FIGS. 17A-B illustrate examples of a second prefix.
Figure 17B:
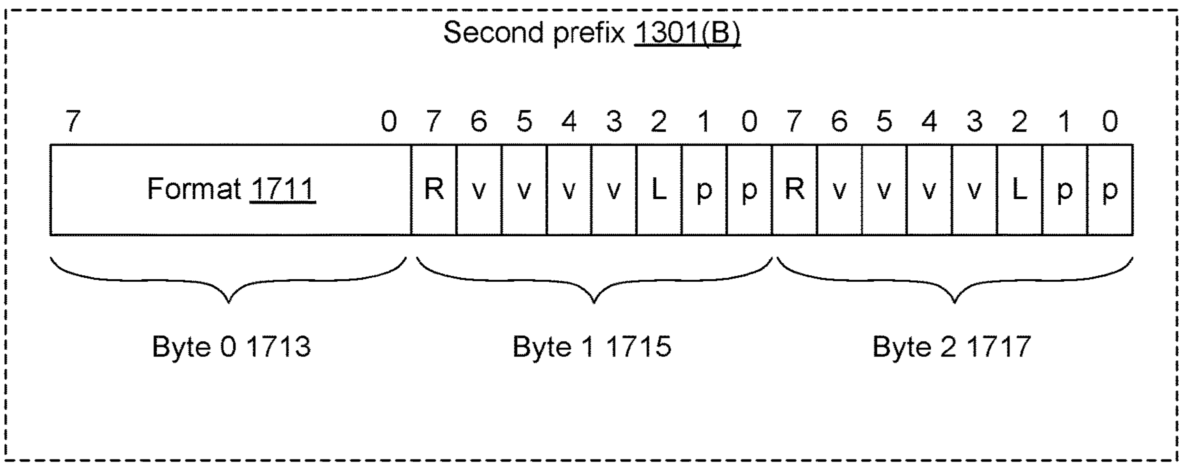

FIGS. 17A-B illustrate examples of a second prefix 1301(B). In some examples, the second prefix 1301(B) is an example of a VEX prefix. The second prefix 1301(B) encoding allows instructions to have more than two operands, and allows SIMD vector registers (e.g., vector/SIMD registers 1210) to be longer than 64-bits (e.g., 128-bit and 256-bit). The use of the second prefix 1301(B) provides for three-operand (or more) syntax. For example, previous two-operand instructions performed operations such as A=A+B, which overwrites a source operand. The use of the second prefix 1301(B) enables operands to perform nondestructive operations such as A=B+C.

In some examples, the second prefix 1301(B) comes in two forms—a two-byte form and a three-byte form. The two-byte second prefix 1301(B) is used mainly for 128-bit, scalar, and some 256-bit instructions; while the three-byte second prefix 1301(B) provides a compact replacement of the first prefix 1301(A) and 3-byte opcode instructions.

FIG. 17A illustrates examples of a two-byte form of the second prefix 1301(B). In one example, a format field 1701 (byte 0 1703) contains the value C5H. In one example, byte 1 1705 includes a "R" value in bit[7]. This value is the complement of the "R" value of the first prefix 1301(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H. 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 1446 to encode the instruction operand that references a memory address or encode either the destination register operand or a source register operand.

Instructions that use this prefix may use the Mod R/M reg field 1444 to encode either the destination register operand or a source register operand, be treated as an opcode extension and not used to encode any instruction operand.

For instruction syntax that support four operands, vvvv, the Mod R/M R/M field 1446 and the Mod R/M reg field 1444 encode three of the four operands. Bits[7:4] of the immediate 1309 are then used to encode the third source register operand.

FIG. 17B illustrates examples of a three-byte form of the second prefix 1301(B). In one example, a format field 1711 (byte 0 1713) contains the value C4H. Byte 1 1715 includes in bits[7:5] "R," "X," and "B" which are the complements of the same values of the first prefix 1301(A). Bits[4:0] of byte 1 1715 (shown as mmmmm) include content to encode, as need, one or more implied leading opcode bytes. For example, 00001 implies a 0FH leading opcode, 00010 implies a 0F38H leading opcode, 00011 implies a leading 0F3AH opcode, etc.

Bit[7] of byte 2 1717 is used similar to W of the first prefix 1301(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H. 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 1446 to encode the instruction operand that references a memory address or encode either the destination register operand or a source register operand.

Instructions that use this prefix may use the Mod R/M reg field 1444 to encode either the destination register operand or a source register operand, be treated as an opcode extension and not used to encode any instruction operand.

For instruction syntax that support four operands, vvvv, the Mod R/M R/M field 1446, and the Mod R/M reg field 1444 encode three of the four operands. Bits[7:4] of the immediate 1309 are then used to encode the third source register operand.

Figure 18:
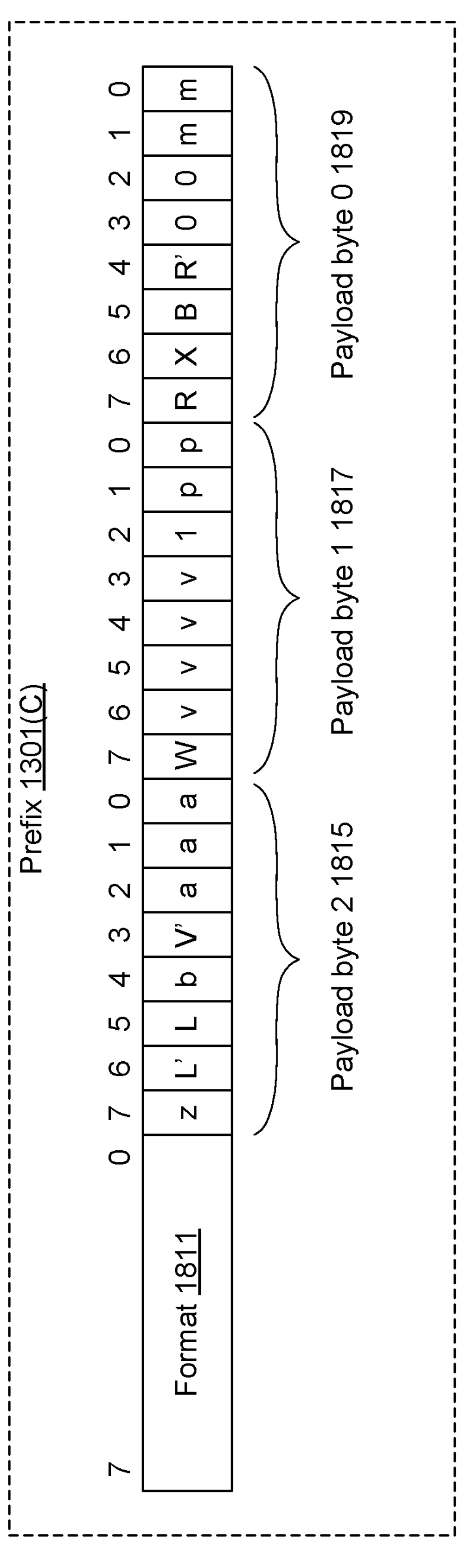
FIG. 18 illustrates examples of a third prefix.

FIG. 18 illustrates examples of a third prefix 1301(C). In some examples, the first prefix 1301(A) is an example of an EVEX prefix. The third prefix 1301(C) is a four-byte prefix.

The third prefix 1301(C) can encode 32 vector registers (e.g., 128-bit, 256-bit, and 512-bit registers) in 64-bit mode. In some examples, instructions that utilize a writemask/opmask (see discussion of registers in a previous figure, such as FIG. 12) or predication utilize this prefix. Opmask register allow for conditional processing or selection control. Opmask instructions, whose source/destination operands are opmask registers and treat the content of an opmask register as a single value, are encoded using the second prefix 1301(B).

The third prefix 1301(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 1301(C) is a format field 1811 that has a value, in one example, of 62H. Subsequent bytes are referred to as payload bytes 1815-1819 and collectively form a 24-bit value of P[23:0] providing specific capability in the form of one or more fields (detailed herein).

In some examples, P[1:0] of payload byte 1819 are identical to the low two mmmmm bits. P[3:2] are reserved in some examples. Bit P[4] (R') allows access to the high 16 vector register set when combined with P[7] and the ModR/M reg field 1444. P[6] can also provide access to a high 16 vector register when SIB-type addressing is not needed. P[7:5] consist of an R, X, and B which are operand specifier modifier bits for vector register, general purpose register, memory addressing and allow access to the next set of 8 registers beyond the low 8 registers when combined with the ModR/M register field 1444 and ModR/M R/M field 1446. P[9:8] provide opcode extensionality equivalent to some legacy prefixes (e.g., 00=no prefix, 01=66H, 10=F3H, and 11=F2H). P[10] in some examples is a fixed value of 1. P[14:11], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

P[15] is similar to W of the first prefix 1301(A) and second prefix 1301(B) and may serve as an opcode extension bit or operand size promotion.

P[18:16] specify the index of a register in the opmask (writemask) registers (e.g., writemask/predicate registers 1215). In one example, the specific value aaa=000 has a special behavior implying no opmask is used for the particular instruction (this may be implemented in a variety of ways including the use of an opmask hardwired to all ones or hardware that bypasses the masking hardware). When merging, vector masks allow any set of elements in the destination to be protected from updates during the execution of any operation (specified by the base operation and the augmentation operation); in other one example, preserving the old value of each element of the destination where the corresponding mask bit has a 0. In contrast, when zeroing vector masks allow any set of elements in the destination to be zeroed during the execution of any operation (specified by the base operation and the augmentation operation); in one example, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While examples are described in which the opmask field's content selects one of a number of opmask registers that contains the opmask to be used (and thus the opmask field's content indirectly identifies that masking is to be performed), alternative examples instead or additionally allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Exemplary examples of encoding of registers in instructions using the third prefix 1301(C) are detailed in the following tables.

TABLE 1

32-Register Support in 64-bit Mode

| | 4 | 3 | [2:0] | REG. TYPE | COMMON USAGES |
|---|---|---|---|---|---|
| REG | R' | R | ModR/M reg | GPR, Vector | Destination or Source |
| VVVV | V' | | vvvv | GPR, Vector | 2nd Source or Destination |
| RM | X | B | ModR/M R/M | GPR, Vector | 1st Source or Destination |
| BASE | 0 | B | ModR/M R/M | GPR | Memory addressing |
| INDEX | 0 | X | SIB.index | GPR | Memory addressing |
| VIDX | V' | X | SIB.index | Vector | VSIB memory addressing |

TABLE 2

Encoding Register Specifiers in 32-bit Mode

| | [2:0] | REG. TYPE | COMMON USAGES |
|---|---|---|---|
| REG | ModR/M reg | GPR, Vector | Destination or Source |
| VVVV | vvvv | GPR, Vector | 2nd Source or Destination |
| RM | ModR/M R/M | GPR, Vector | 1st Source or Destination |
| BASE | ModR/M R/M | GPR | Memory addressing |
| INDEX | SIB.index | GPR | Memory addressing |
| VIDX | SIB.index | Vector | VSIB memory addressing |

TABLE 3

Opmask Register Specifier Encoding

| | [2:0] | REG. TYPE | COMMON USAGES |
|---|---|---|---|
| REG | ModR/M Reg | k0-k7 | Source |
| VVVV | vvvv | k0-k7 | 2nd Source |
| RM | ModR/M R/M | k0-k7 | 1st Source |
| {k1] | aaa | k0-k7 | Opmask |

Program code may be applied to input information to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), a field programmable gate array (FPGA), a microprocessor, or any combination thereof.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Examples of the mechanisms disclosed herein may be implemented in hardware, software, firmware, or a combination of such implementation approaches. Examples may be implemented as computer programs or program code executing on programmable systems comprising at least one processor, a storage system (including volatile and non-volatile memory and/or storage elements), at least one input device, and at least one output device.

One or more aspects of at least one example may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, examples also include non-transitory, tangible machine-readable media containing instructions or containing design data, such as Hardware Description Language (HDL), which defines structures, circuits, apparatuses, processors and/or system features described herein. Such examples may also be referred to as program products.

Emulation (Including Binary Translation, Code Morphing, Etc.)

In some cases, an instruction converter may be used to convert an instruction from a source instruction set architecture to a target instruction set architecture. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 19:
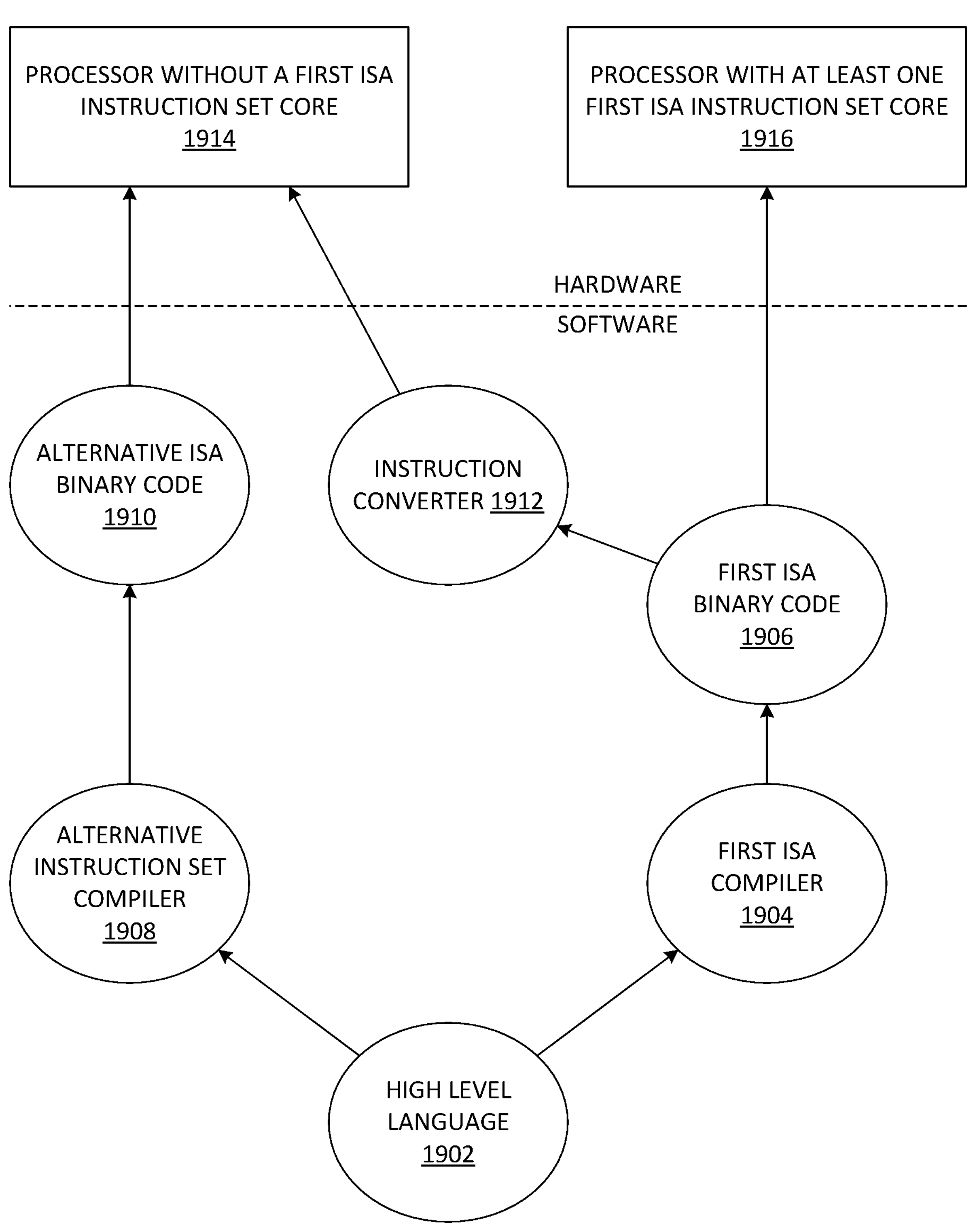
FIG. 19 is a block diagram illustrating the use of a software instruction converter to convert binary instructions in a source instruction set architecture to binary instructions in a target instruction set architecture according to examples.

FIG. 19 illustrates a block diagram contrasting the use of a software instruction converter to convert binary instructions in a source instruction set architecture to binary instructions in a target instruction set architecture according to examples. In the illustrated example, the instruction converter is a software instruction converter, although alternatively the instruction converter may be implemented in software, firmware, hardware, or various combinations thereof. FIG. 19 shows a program in a high-level language 1902 may be compiled using a first ISA compiler 1904 to generate first ISA binary code 1906 that may be natively executed by a processor with at least one first instruction set architecture core 1916. The processor with at least one first ISA instruction set architecture core 1916 represents any processor that can perform substantially the same functions as an Intel® processor with at least one first ISA instruction set architecture core by compatibly executing or otherwise processing (1) a substantial portion of the instruction set architecture of the first ISA instruction set architecture core or (2) object code versions of applications or other software targeted to run on an Intel processor with at least one first ISA instruction set architecture core, in order to achieve substantially the same result as a processor with at least one first ISA instruction set architecture core. The first ISA compiler 1904 represents a compiler that is operable to generate first ISA binary code 1906 (e.g., object code) that can, with or without additional linkage processing, be executed on the processor with at least one first ISA instruction set architecture core 1916. Similarly, FIG. 19 shows the program in the high-level language 1902 may be compiled using an alternative instruction set architecture compiler 1908 to generate alternative instruction set architecture binary code 1910 that may be natively executed by a processor without a first ISA instruction set architecture core 1914. The instruction converter 1912 is used to convert the first ISA binary code 1906 into code that may be natively executed by the processor without a first ISA instruction set architecture core 1914. This converted code is not necessarily to be the same as the alternative instruction set architecture binary code 1910; however, the converted code will accomplish the general operation and be made up of instructions from the alternative instruction set architecture. Thus, the instruction converter 1912 represents software, firmware, hardware, or a combination thereof that, through emulation, simulation or any other process, allows a processor or other electronic device that does not have a first ISA instruction set architecture processor or core to execute the first ISA binary code 1906.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" or "A, B, and/or C" is intended to be understood to mean either A, B, or C, or any combination thereof (i.e. A and B. A and C, B and C, and A, B and C).

The specification and drawings are, accordingly, to be regarded in an illustrative rather than a restrictive sense. It will, however, be evident that various modifications and changes may be made thereunto without departing from the broader spirit and scope of the disclosure as set forth in the claims.

In one or more first embodiments, a processor core comprises an instruction fetch resource comprising multiple entries which are each to correspond to a different respective instruction, wherein a first entry of the multiple entries is to correspond to a first instruction, first circuitry to search the multiple entries of the instruction fetch resource to detect a location of a version of the first instruction, second circuitry to perform a selection of a victim entry to be evicted from the instruction fetch resource, wherein the selection is performed based on a prioritization scheme while a first one or more entries of the multiple entries are each assigned a first priority level of the prioritization scheme, and while a second one or more entries of the multiple entries are each assigned a second priority level of the prioritization scheme, wherein the victim entry is selected from among only the second one or more entries, and third circuitry to assign the first priority level to the first entry based on a retirement event wherein the first instruction is retired after a stall of the processor core, wherein the stall is based on the first instruction.

In one or more second embodiments, further to the first embodiment, the stall is based on a miss of the instruction fetch resource, and wherein the miss is based on the first instruction.

In one or more third embodiments, further to the first embodiment or the second embodiment, the instruction fetch resource is an instruction cache.

In one or more fourth embodiments, further to the first embodiment or the second embodiment, the instruction fetch resource is a translation lookaside buffer.

In one or more fifth embodiments, further to the first embodiment or the second embodiment, the instruction fetch resource is a decode stream buffer.

In one or more sixth embodiments, further to the first embodiment or the second embodiment, the instruction fetch resource is a branch target buffer.

In one or more seventh embodiments, further to any of the first through sixth embodiments, the instruction fetch resource comprises a first partition corresponding to the first priority level and a second partition corresponding to the second priority level, and wherein the third circuitry to assign the first priority level to the first entry comprises the third circuitry to move the first entry from the second partition to the first partition.

In one or more eighth embodiments, further to the seventh embodiment, the first partition and the second partition are each a respective virtual partition of the instruction fetch resource.

In one or more ninth embodiments, further to the seventh embodiment, the processor core further comprises fourth circuitry to change a size of the first partition.

In one or more tenth embodiments, further to any of the first through sixth embodiments, the instruction fetch resource is a first cache, wherein the multiple entries are first multiple entries, wherein the prioritization scheme is a first prioritization scheme, wherein the retirement event is a first retirement event, wherein the stall is a first stall, and wherein the processor core further comprises a second cache which comprises second multiple entries which are each to correspond to a different respective instruction, wherein a second entry of the second multiple entries is to correspond to a second instruction, wherein the first circuitry is further to search the second cache based on a miss of the first cache, fifth circuitry to perform an assignment of a third priority level to the second entry based on a second retirement event wherein the second instruction is retired after a second stall of the processor core, wherein the second stall is based on the second instruction, and wherein a second prioritization scheme comprises the third priority level and a fourth priority level, and sixth circuitry to perform a search to determine whether a target instruction is to be prefetched from the second cache, wherein the search is performed while a third one or more entries of the second multiple entries are each assigned the third priority level, and while a fourth one or more entries of the second multiple entries are each assigned the fourth priority level, and wherein, based on the second prioritization scheme, any entry selected by the search is one of the third one or more entries.

In one or more eleventh embodiments, further to the tenth embodiment, the fifth circuitry to perform the assignment of the third priority level to the second entry comprises the fifth circuitry to generate reference information which identifies a correspondence of the target instruction with a trigger instruction which precedes the target instruction in a sequence of instructions, wherein the sixth circuitry is further to receive an indication that the trigger instruction is to be executed, and access the reference information, based on the indication, to identify the correspondence of the target instruction with the trigger instruction.

In one or more twelfth embodiments, a method at a processor core comprises searching multiple entries of an instruction fetch resource to detect a location of a version of a first instruction, wherein the multiple entries each correspond to a different respective instruction, and wherein a first entry of the multiple entries corresponds to the first instruction, performing a selection of a victim entry to be evicted from the instruction fetch resource, wherein the selection is performed based on a prioritization scheme while a first one or more entries of the multiple entries are each assigned a first priority level of the prioritization scheme, and while a second one or more entries of the multiple entries are each assigned a second priority level of the prioritization scheme, wherein the victim entry is selected from among only the second one or more entries, and assigning the first priority level to the first entry based on a retirement event wherein the first instruction is retired after a stall of the processor core, wherein the stall is based on the first instruction.

In one or more thirteenth embodiments, further to the twelfth embodiment, the stall is based on a miss of the instruction fetch resource, and wherein the miss is based on the first instruction.

In one or more fourteenth embodiments, further to the twelfth embodiment or the thirteenth embodiment, the instruction fetch resource is an instruction cache.

In one or more fifteenth embodiments, further to the twelfth embodiment or the thirteenth embodiment, the instruction fetch resource is a translation lookaside buffer.

In one or more sixteenth embodiments, further to the twelfth embodiment or the thirteenth embodiment, the instruction fetch resource is a decode stream buffer.

In one or more seventeenth embodiments, further to the twelfth embodiment or the thirteenth embodiment, the instruction fetch resource is a branch target buffer.

In one or more eighteenth embodiments, further to any of the twelfth through seventeenth embodiments, the instruction fetch resource comprises a first partition corresponding to the first priority level and a second partition corresponding to the second priority level, and wherein assigning the first priority level to the first entry comprises moving the first entry from the second partition to the first partition.

In one or more nineteenth embodiments, further to the eighteenth embodiment, the first partition and the second partition are each a respective virtual partition of the instruction fetch resource.

In one or more twentieth embodiments, further to the eighteenth embodiment, the method further comprises changing a size of the first partition.

In one or more twenty-first embodiments, further to any of the twelfth through seventeenth embodiments, the multiple entries are first multiple entries, wherein the prioritization scheme is a first prioritization scheme, wherein the retirement event is a first retirement event, wherein the stall is a first stall, and wherein the method further comprises based on a miss of a first cache, searching a second cache which comprises second multiple entries which each correspond to a different respective instruction, wherein a second entry of the second multiple entries corresponds to a second instruction, performing an assignment of a third priority level to the second entry based on a second retirement event wherein the second instruction is retired after a second stall of the processor core, wherein the second stall is based on the second instruction, and wherein a second prioritization scheme comprises the third priority level and a fourth priority level, and performing a search to determine whether a target instruction is to be prefetched from the second cache, wherein the search is performed while a third one or more entries of the second multiple entries are each assigned the third priority level, and while a fourth one or more entries of the second multiple entries are each assigned the fourth priority level, and wherein, based on the second prioritization scheme, any entry selected by the search is one of the third one or more entries.

In one or more twenty-second embodiments, further to the twenty-first embodiment, performing the assignment of the third priority level to the second entry comprises generating reference information which identifies a correspondence of the target instruction with a trigger instruction which precedes the target instruction in a sequence of instructions, wherein the method further comprises receiving an indication that the trigger instruction is to be executed, and based on the indication, accessing the reference information to identify the correspondence of the target instruction with the trigger instruction.

In one or more twenty-third embodiments, a system comprises a processor core comprising an instruction fetch resource comprising multiple entries which are each to correspond to a different respective instruction, wherein a first entry of the multiple entries is to correspond to a first instruction, first circuitry to search the multiple entries of the instruction fetch resource to detect a location of a version of the first instruction, second circuitry to perform a selection of a victim entry to be evicted from the instruction fetch resource, wherein the selection is performed based on a prioritization scheme while a first one or more entries of the multiple entries are each assigned a first priority level of the prioritization scheme, and while a second one or more entries of the multiple entries are each assigned a second priority level of the prioritization scheme, wherein the victim entry is selected from among only the second one or more entries, and third circuitry to assign the first priority level to the first entry based on a retirement event wherein the first instruction is retired after a stall of the processor core, wherein the stall is based on the first instruction, and a memory coupled to the processor core, the memory to store instructions comprising the first instruction.

In one or more twenty-fourth embodiments, further to the twenty-third embodiment, the stall is based on a miss of the instruction fetch resource, and wherein the miss is based on the first instruction.

In one or more twenty-fifth embodiments, further to the twenty-third embodiment or the twenty-fourth embodiment, the instruction fetch resource is an instruction cache.

In one or more twenty-sixth embodiments, further to the twenty-third embodiment or the twenty-fourth embodiment, the instruction fetch resource is a translation lookaside buffer.

In one or more twenty-seventh embodiments, further to the twenty-third embodiment or the twenty-fourth embodiment, the instruction fetch resource is a decode stream buffer.

In one or more twenty-eighth embodiments, further to the twenty-third embodiment or the twenty-fourth embodiment, the instruction fetch resource is a branch target buffer.

In one or more twenty-ninth embodiments, further to any of the twenty-third through twenty-eighth embodiments, the instruction fetch resource comprises a first partition corresponding to the first priority level and a second partition corresponding to the second priority level, and wherein the third circuitry to assign the first priority level to the first entry comprises the third circuitry to move the first entry from the second partition to the first partition.

In one or more thirtieth embodiments, further to the twenty-ninth embodiment, the first partition and the second partition are each a respective virtual partition of the instruction fetch resource.

In one or more thirty-first embodiments, further to the twenty-ninth embodiment, the processor core further comprises fourth circuitry to change a size of the first partition.

In one or more thirty-second embodiments, further to any of the twenty-third through twenty-eighth embodiments, the instruction fetch resource is a first cache, wherein the multiple entries are first multiple entries, wherein the prioritization scheme is a first prioritization scheme, wherein the retirement event is a first retirement event, wherein the stall is a first stall, and wherein the processor core further comprises a second cache which comprises second multiple entries which are each to correspond to a different respective instruction, wherein a second entry of the second multiple entries is to correspond to a second instruction, wherein the first circuitry is further to search the second cache based on a miss of the first cache, fifth circuitry to perform an assignment of a third priority level to the second entry based on a second retirement event wherein the second instruction is retired after a second stall of the processor core, wherein the second stall is based on the second instruction, and wherein a second prioritization scheme comprises the third priority level and a fourth priority level, and sixth circuitry to perform a search to determine whether a target instruction is to be prefetched from the second cache, wherein the search is performed while a third one or more entries of the second multiple entries are each assigned the third priority level, and while a fourth one or more entries of the second multiple entries are each assigned the fourth priority level, and wherein, based on the second prioritization scheme, any entry selected by the search is one of the third one or more entries.

In one or more thirty-third embodiments, further to the thirty-second embodiment, the fifth circuitry to perform the assignment of the third priority level to the second entry comprises the fifth circuitry to generate reference information which identifies a correspondence of the target instruction with a trigger instruction which precedes the target instruction in a sequence of instructions, wherein the sixth circuitry is further to receive an indication that the trigger instruction is to be executed, and access the reference information, based on the indication, to identify the correspondence of the target instruction with the trigger instruction.

Techniques and architectures for prioritizing entries of an instruction fetch resource are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A processor core comprising:

an instruction fetch resource comprising multiple entries which are each to correspond to a different respective instruction, wherein a first entry of the multiple entries is to correspond to a first instruction;

first circuitry to search the multiple entries of the instruction fetch resource to detect a location of a version of the first instruction;

second circuitry to perform a selection of a victim entry to be evicted from the instruction fetch resource, wherein the selection is performed based on a prioritization scheme while a first one or more entries of the multiple entries are each assigned a first priority level of the prioritization scheme, and while a second one or more entries of the multiple entries are each assigned a second priority level of the prioritization scheme, wherein the victim entry is selected from among only the second one or more entries; and third circuitry to assign the first priority level to the first entry based on a retirement event comprising a retirement of the first instruction after a stall of the processor core, wherein the stall is based on the first instruction.

2. The processor core of claim 1, wherein the stall is based on a miss of the instruction fetch resource, and wherein the miss is based on the first instruction.

3. The processor core of claim 1, wherein the instruction fetch resource is an instruction cache.

4. The processor core of claim 1, wherein the instruction fetch resource is a translation lookaside buffer.

5. The processor core of claim 1, wherein the instruction fetch resource is a decode stream buffer.

6. The processor core of claim 1, wherein the instruction fetch resource is a branch target buffer.

7. The processor core of claim 1, wherein the instruction fetch resource comprises a first partition corresponding to the first priority level and a second partition corresponding to the second priority level, and wherein the third circuitry to assign the first priority level to the first entry comprises the third circuitry to move the first entry from the second partition to the first partition.

8. The processor core of claim 7, wherein the first partition and the second partition are each a respective virtual partition of the instruction fetch resource.

9. The processor core of claim 7, further comprising fourth circuitry to change a size of the first partition.

10. The processor core of claim 1, wherein the instruction fetch resource is a first cache, wherein the multiple entries are first multiple entries, wherein the prioritization scheme is a first prioritization scheme, wherein the retirement event is a first retirement event, wherein the stall is a first stall, and wherein the processor core further comprises:

a second cache which comprises second multiple entries which are each to correspond to a different respective instruction, wherein a second entry of the second multiple entries is to correspond to a second instruction, wherein the first circuitry is further to search the second cache based on a miss of the first cache;

fifth circuitry to perform an assignment of a third priority level to the second entry based on a second retirement event, wherein the second instruction is retired after a second stall of the processor core, wherein the second stall is based on the second instruction, and wherein a second prioritization scheme comprises the third priority level and a fourth priority level; and sixth circuitry to perform a first search to determine whether a target instruction is to be prefetched from the second cache, wherein the first search is performed while a third one or more entries of the second multiple entries are each assigned the third priority level, and while a fourth one or more entries of the second multiple entries are each assigned the fourth priority level, and wherein, based on the second prioritization scheme, anyentry selected by the first search is one of the third one or more entries.

11. The processor core of claim 10, wherein:

the fifth circuitry to perform the assignment of the third priority level to the second entry comprises the fifth circuitry to generate reference information which identifies a correspondence of the target instruction with a trigger instruction which precedes the target instruction in a sequence of instructions; and wherein the sixth circuitry is further to:

receive an indication that the trigger instruction is to be executed; and access the reference information, based on the indication, to identify the correspondence of the target instruction with the trigger instruction.

12. A method at a processor core, the method comprising:

searching multiple entries of an instruction fetch resource to detect a location of a version of a first instruction, wherein the multiple entries each correspond to a different respective instruction, and wherein a first entry of the multiple entries corresponds to the first instruction;

performing a selection of a victim entry to be evicted from the instruction fetch resource, wherein the selection is performed based on a prioritization scheme while a first one or more entries of the multiple entries are each assigned a first priority level of the prioritization scheme, and while a second one or more entries of the multiple entries are each assigned a second priority level of the prioritization scheme, wherein the victim entry is selected from among only the second one or more entries;

detecting a retirement event comprising a retirement of the first instruction after a stall of the processor core, wherein the stall is based on the first instruction; and assigning the first priority level to the first entry based on the retirement event.

13. The method of claim 12, wherein the stall is based on a miss of the instruction fetch resource, and wherein the miss is based on the first instruction.

14. The method of claim 12, wherein the instruction fetch resource is an instruction cache.

15. The method of claim 12, wherein the multiple entries are first multiple entries, wherein the prioritization scheme is a first prioritization scheme, wherein the retirement event is a first retirement event, wherein the stall is a first stall, and wherein the method further comprises:

based on a miss of a first cache, searching a second cache which comprises second multiple entries which each correspond to a different respective instruction, wherein a second entry of the second multiple entries corresponds to a second instruction;

performing an assignment of a third priority level to the second entry based on a second retirement event, wherein the second instruction is retired after a second stall of the processor core, wherein the second stall is based on the second instruction, and wherein a second prioritization scheme comprises the third priority level and a fourth priority level; and performing a first search to determine whether a target instruction is to be prefetched from the second cache, wherein the first search is performed while a third one or more entries of the second multiple entries are each assigned the third priority level, and while a fourth one or more entries of the second multiple entries are each assigned the fourth priority level, and wherein, based on the second prioritization scheme, any entry selected by the first search is one of the third one or more entries.

16. A system comprising:

a processor core comprising:

an instruction fetch resource comprising multiple entries which are each to correspond to a different respective instruction, wherein a first entry of the multiple entries is to correspond to a first instruction;

first circuitry to search the multiple entries of the instruction fetch resource to detect a location of a version of the first instruction;

second circuitry to perform a selection of a victim entry to be evicted from the instruction fetch resource, wherein the selection is performed based on a prioritization scheme while a first one or more entries of the multiple entries are each assigned a first priority level of the prioritization scheme, and while a second one or more entries of the multiple entries are each assigned a second priority level of the prioritization scheme, wherein the victim entry is selected from among only the second one or more entries; and third circuitry to assign the first priority level to the first entry based on a retirement event comprising a retirement of the first instruction after a stall of the processor core, wherein the stall is based on the first instruction; and a memory coupled to the processor core, the memory to store instructions comprising the first instruction.

17. The system of claim 16, wherein the stall is based on a miss of the instruction fetch resource, and wherein the miss is based on the first instruction.

18. The system of claim 16, wherein the instruction fetch resource is an instruction cache.

19. The system of claim 16, wherein the instruction fetch resource comprises a first partition corresponding to the first priority level and a second partition corresponding to the second priority level, and wherein the third circuitry to assign the first priority level to the first entry comprises the third circuitry to move the first entry from the second partition to the first partition.

20. The system of claim 16, wherein the instruction fetch resource is a first cache, wherein the multiple entries are first multiple entries, wherein the prioritization scheme is a first prioritization scheme, wherein the retirement event is a first retirement event, wherein the stall is a first stall, and wherein the processor core further comprises:

a second cache which comprises second multiple entries which are each to correspond to a different respective instruction, wherein a second entry of the second multiple entries is to correspond to a second instruction, wherein the first circuitry is further to search the second cache based on a miss of the first cache;

fifth circuitry to perform an assignment of a third priority level to the second entry based on a second retirement event, wherein the second instruction is retired after a second stall of the processor core, wherein the second stall is based on the second instruction, and wherein a second prioritization scheme comprises the third priority level and a fourth priority level; and sixth circuitry to perform a first search to determine whether a target instruction is to be prefetched from the second cache, wherein the first search is performed while a third one or more entries of the second multiple entries are each assigned the third priority level, and while a fourth one or more entries of the second multiple entries are each assigned the fourth priority level, and wherein, based on the second prioritization scheme, anyentry selected by the first search is one of the third one or more entries.

* * * * *